United States Patent
Yan et al.

(10) Patent No.: US 11,886,535 B2
(45) Date of Patent: Jan. 30, 2024

(54) OSCILLATING SHEAR VALVE OF CONTINUOUS PULSE GENERATOR

(71) Applicant: CHINA UNIVERSITY OF PETROLEUM (EAST CHINA), Qingdao (CN)

(72) Inventors: Zhidan Yan, Qingdao (CN); Nan Yang, Qingdao (CN); Xue Yin, Qingdao (CN); Zhenyu Yang, Qingdao (CN); Yupeng Zheng, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/239,672

(22) Filed: Aug. 29, 2023

(65) Prior Publication Data
US 2023/0418892 A1 Dec. 28, 2023

Related U.S. Application Data

(63) Continuation-in-part of application No. PCT/CN2021/086351, filed on Apr. 12, 2021.

(30) Foreign Application Priority Data

Mar. 2, 2021 (CN) .......................... 202110228875.7

(51) Int. Cl.
*H04N 5/44* (2011.01)
*G06F 17/11* (2006.01)
(Continued)

(52) U.S. Cl.
CPC .............. *G06F 17/11* (2013.01); *E21B 21/08* (2013.01); *E21B 47/18* (2013.01)

(58) Field of Classification Search
CPC ........... G06F 17/11; E21B 21/08; E21B 47/18
See application file for complete search history.

(56) References Cited

U.S. PATENT DOCUMENTS

| 4,847,815 A | 7/1989 | Malone |
| 5,473,579 A * | 12/1995 | Jeter ........................ G01V 1/52 |
| | | 367/83 |

(Continued)

FOREIGN PATENT DOCUMENTS

| CN | 103591325 A | 2/2014 |
| CN | 103696763 B | 4/2014 |

(Continued)

OTHER PUBLICATIONS

International Search Report for PCT/CN2021/086351.

*Primary Examiner* — Munear T Akki
(74) *Attorney, Agent, or Firm* — J.C. PATENTS

(57) ABSTRACT

An oscillating shear valve of a continuous pulse generator comprises a rotator and a stator which are coaxially mounted, valve orifices are formed on the rotator and the stator, each of the valve orifices comprises a circular arc line, two straight line segments and two fillets, and is designed by establishing polar coordinate equations of the circular arc line, the straight line segments and the fillets and calculating a mud throttling area formed when the oscillating shear valve moves and determining parameters of structures of the valve orifices by a correlation coefficient index of the fluid differential pressure and a standard sinusoidal wave.

2 Claims, 9 Drawing Sheets

(51) Int. Cl.
    *E21B 21/08*     (2006.01)
    *E21B 47/18*     (2012.01)

(56) References Cited

U.S. PATENT DOCUMENTS

| | | | | |
|---|---|---|---|---|
| 5,740,127 | A * | 4/1998 | Van Steenwyk | E21B 47/24 33/307 |
| 6,053,261 | A * | 4/2000 | Walter | E21B 7/18 175/243 |
| 6,237,701 | B1 * | 5/2001 | Kolle | E21B 21/103 175/38 |
| 7,280,432 | B2 | 10/2007 | Hahn | |
| 2002/0159333 | A1 * | 10/2002 | Hahn | E21B 47/20 367/83 |
| 2008/0068929 | A1 | 3/2008 | Hahn | |
| 2015/0075867 | A1 * | 3/2015 | Eddison | E21B 7/24 175/56 |
| 2015/0275660 | A1 * | 10/2015 | Logan | E21B 47/24 175/48 |
| 2016/0010449 | A1 * | 1/2016 | Liu | F15B 21/125 166/66.4 |
| 2017/0260853 | A1 * | 9/2017 | Stack | E21B 47/24 |

FOREIGN PATENT DOCUMENTS

| | | |
|---|---|---|
| CN | 104481518 A | 4/2015 |
| CN | 104482233 A | 4/2015 |
| CN | 105422029 A | 3/2016 |
| CN | 109339770 A | 2/2019 |
| CN | 109339770 B | 8/2020 |

\* cited by examiner

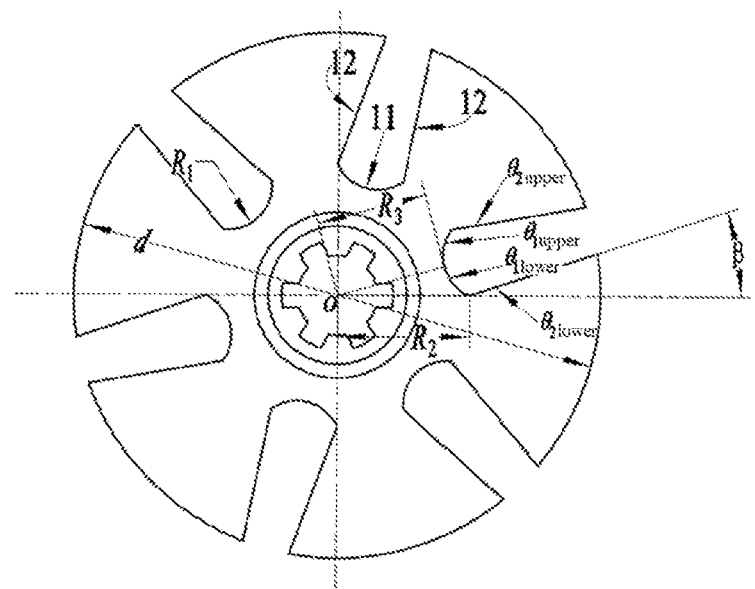
Fig. 1
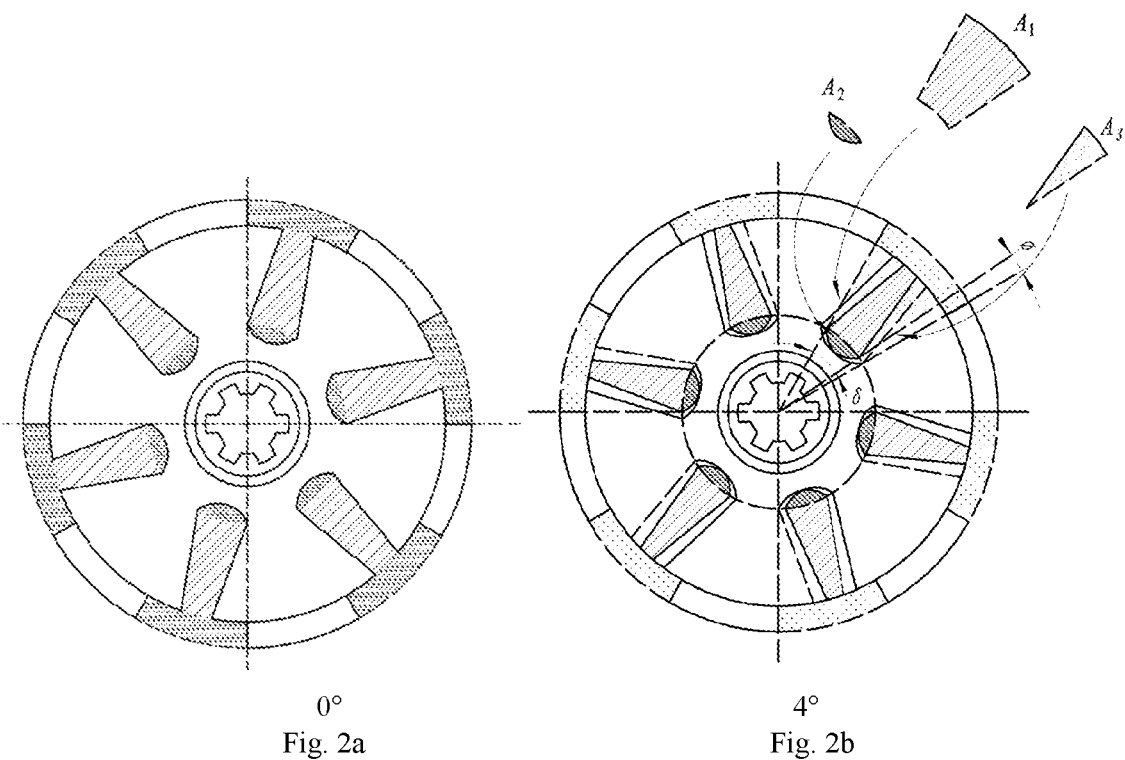
0°  
Fig. 2a
4°  
Fig. 2b

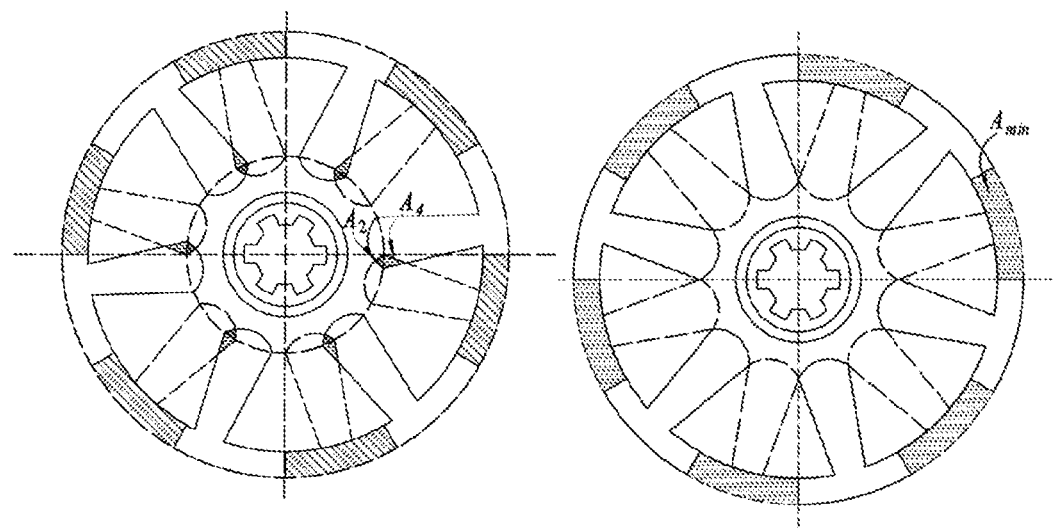
22°
Fig. 2c
30°
Fig. 2d
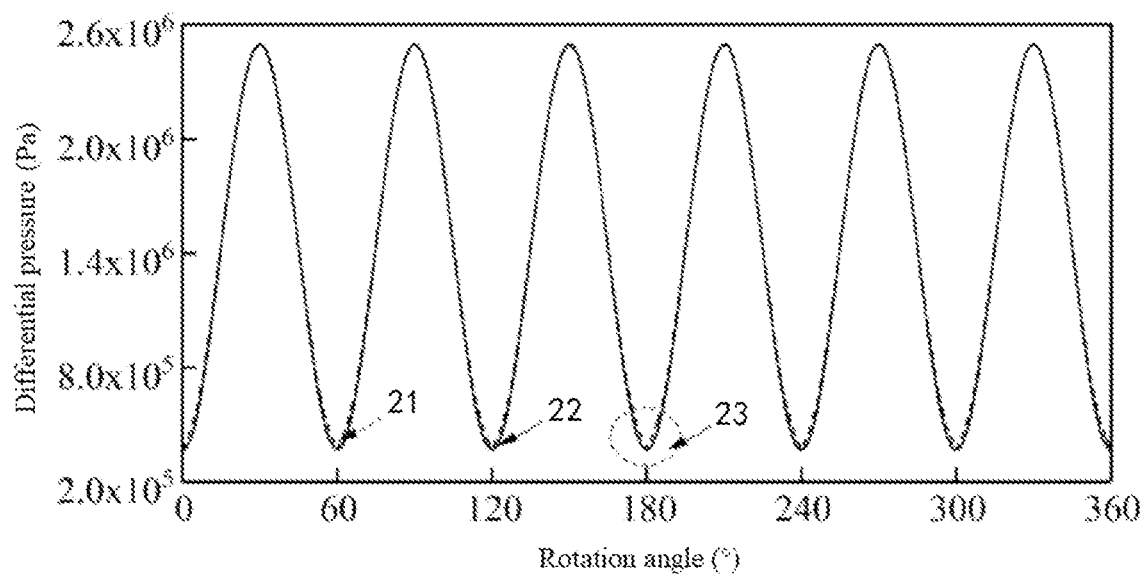
Fig. 3

0°

5°

14°

24°

27°

30°

OSCILLATING SHEAR VALVE OF CONTINUOUS PULSE GENERATOR

CROSS REFERENCE TO RELATED APPLICATIONS

The present application is a continuation-in-part of the international application PCT/CN2021/086351 filed on Apr. 12, 2021, which claims the priority to the Chinese Patent Application No. 202110228875.7, filed to the Chinese Patent Office on Mar. 2, 2021 and entitled "DESIGN METHOD FOR OSCILLATING SHEAR VALVE ORIFICE OF CONTINUOUS PULSE GENERATOR AND OSCILLATING SHEAR VALVE", the entire contents of the above identified applications are incorporated herein by reference.

TECHNICAL FIELD

The present application belongs to the technical field of petroleum and natural gas, relates to a measurement while drilling technology, and in particular to an oscillating shear valve of a continuous pulse generator.

BACKGROUND

The technology of continuous pulse transmission while drilling is a leading-edge information transmission technology for modulating a code of data acquired by a downhole MWD (Measure While Drilling)/LWD (Logging While Drilling) measuring instrument into a mud pressure wave by using a continuous mud pulse generator during real-time drilling operation, collecting the mud pressure wave by a riser pressure sensor and reducing the mud pressure wave into a downhole orientation parameter, a geological parameter, an engineering parameter or other parameters after a series of processing such as denoising, demodulation and decoding when the pressure wave is transmitted upwards to the ground along a mud medium inside a drilling rod. A rotary valve consisting of a stator and a rotator serves as a core component of a continuous pulse generator, and the stator and the rotator have the same end surface; by driving the rotator and the stator to move relatively, the throttling area of mud can be changed to generate a pressure wave; when the area is increased, the mud flows smoothly, and thus, the pressure is reduced; and conversely, the flow of the mud is blocked, and thus, the pressure is increased.

The continuous pulse generator can be divided into an oscillating shear valve type continuous pulse generator and a rotary valve type continuous pulse generator according to a motion mode of the rotator, the rotator of the oscillating shear valve type continuous pulse generator swings back and forth, and the rotator of the rotary valve type continuous pulse generator rotates continuously. In order to satisfy a requirement for long-distance and high-quality signal transmission, it is necessary to optimally design a rotary valve orifice and precisely control a motion state of the rotator, so that a mud time-varying flow channel formed by the rotator and the stator can generate a continuous and highly similar sinusoidal pressure waveform. Particularly, the rotator of the oscillating shear valve type continuous pulse generator does periodic reciprocating acceleration-constant-speed-deceleration motion relative to the stator thereof around a shaft, and has the advantages of convenience in waveform modulation and few jamming phenomena so as to have certain advantages in practical applications.

An oscillating shear valve orifice is of an internally-tangent shape or an externally-tangent shape according to a processing mode. A flow channel is required to be processed inside the rotator of an internally-tangent oscillating shear valve, so that the rotator is huge in volume and high in rotational inertia, thereby affecting a dynamic performance of the generator; and an externally-tangent oscillating shear valve is small in volume, easy to process and convenient to mount and adjust. The opening shape of an externally-tangent rotator is mainly of a sector, a rectangle and a triangle, which has been deeply searched by domestic and foreign scholars at present, the examples are as below.

The American invention U.S. Pat. No. 4,847,815A discloses a sinusoidal pressure pulse generator for a measurement while drilling tool and specifically discloses a stator and rotator design method for a triangular valve sinusoidal continuous pulse pressure signal generator based on a pressure pulse generation principle of a thin-walled cutting edge. However, it was found after actual measurement that a pressure signal generated by the rotary valve still has a higher deviation than a standard sinusoidal pressure signal.

The Chinese invention patent publication No. CN103696763B discloses a rotary valve of a continuous pulse generator based on a triangular valve, comprising a rotator and a stator, wherein the rotator comprises a plurality of vanes, and each of gaps between the adjacent vanes consists of a circular arc line, a fillet line and a radial line segment. The stator has the same number of vanes as the rotator, and shapes of gaps of the vanes of the stator are evolved from the gaps of the vanes of the rotator.

The Chinese invention patent publication No. CN109339770B discloses a design method for end surfaces of a stator and a rotator of an oscillating shear valve and the oscillating shear valve. The oscillating shear valve comprises a rotator and a stator, wherein the rotator comprises a plurality of vanes, each of gaps between the adjacent vanes consists of a circular arc line and two straight line segments parallel to a polar radius passing through the center of the circle of the circular arc line, the stator has the same number of vanes as the rotator, and has the consistent vane end surfaces as the rotator. In the patent, an oscillating variable-speed motion mode of the rotator is put forward, so that the designed rotator valve is closer to an actual motion law. However, a speed variation conclusion is only given, and a quantitative index and an optimization method of speed variation are not given in detail.

The American invention U.S. Pat. No. 7,280,432B2 discloses an oscillating shear valve for mud pulse telemetry, which is used for an anti-clogging oscillating shear valve system generating pressure fluctuation in a flowing drilling fluid and adopts an eight-vane oscillating shear valve orifice based on a rectangular valve, however, a specific optimal design method for the rotary valve orifice is not described in detail.

SUMMARY

For solving the above-mentioned problems existing in the prior art, the present application provides a design method for an oscillating shear valve orifice of a continuous pulse generator and an oscillating shear valve.

In order to achieve the above-mentioned purposes, the present application provides an oscillating shear valve of a continuous pulse generator, comprising:

a rotator and a stator which are coaxially mounted, wherein the stator and the rotator have a same number $n_b$ of vanes and valve orifices with same structures between the vans, wherein $n_b$=4, 6, 8; each of the valve orifices comprises a circular arc line, two straight line segments and two fillets, each fillet is tangent to the circular arc line and one of the straight line segments, an angle of each valve orifice of the vans is $\pi/n_b$, and a structure of each valve orifice is designed according to following method:

establishing a characteristic equation of rotation angular displacement of the rotator according to an angular speed of the rotator during constant-speed rotating, wherein the characteristic equation is expressed as:

$$\phi = \omega_u t \tag{1}$$

wherein $\phi$ is the rotation angular displacement of the rotator, that is, a rotation angle; $\omega_u$ is the angular speed of the rotator during constant-speed rotating, with a unit: rad/s; and t is constant-speed rotation time;

setting the circular arc line within a first quadrant, dividing the circular arc line into an upper circular arc $\theta_{1upper}(r)$ and a lower circular arc $\theta_{1lower}(r)$ by taking a midpoint of the circular arc line as a boundary, and respectively establishing polar coordinate equations of the upper circular arc $\theta_{1upper}(r)$ and the lower circular arc $\theta_{1lower}(r)$ as:

$$\theta_{1upper}(r) = \alpha_0 + \arccos\left(\frac{L_1 + r^2 - R_1}{2rL_1}\right), r \in [R_3, R_2] \tag{2}$$

$$\theta_{1lower}(r) = \alpha_0 - \arccos\left(\frac{L_1^2 + r^2 - R_1}{2rL_1}\right), r \in [R_3, R_2] \tag{3}$$

wherein r is a polar radius of any point on the circular arc line, and $R_1$ is a radius of the circular arc line; $R_2$ is a maximum polar radius of the circular arc line and is equal to a length of a connecting line segment between a polar point and an upper end point or a lower end point of the circular arc line; $R_3$ is a minimum polar radius of the circular arc line and is equal to a length of a connecting line segment between the polar point and the midpoint of the circular arc line; $L_1$ is a polar radius of a center of a circle of the circular arc line;

$$\alpha_0 = \frac{\pi}{2n_b}$$

is a polar angle corresponding to $R_3$; and $n_b$ is the number of the vanes;

respectively establishing polar coordinate equations of an upper straight line segment $\theta_{2upper}(r)$ and a lower straight line segment $\theta_{2lower}(r)$ as:

$$\theta_{2upper}(r) = \frac{\pi}{n_b} - 2\arctan\left(\frac{-2r + \sqrt{4r^2 - 4\tan^2(\beta)(R_2^2 - r^2)}}{2(r + R_2)\tan(\beta)}\right) \tag{6}$$

$$\theta_{2lower}(r) = 2\arctan\left(\frac{-2r + \sqrt{4r^2 - 4\tan^2(\beta)(R_2^2 - r^2)}}{2(r + R_2)\tan(\beta)}\right) \tag{7}$$

wherein $\beta$ is a bending angle formed by the upper straight line segment $\theta_{2upper}(r)$ and the upper circular arc $\theta_{1upper}(r)$ or the lower straight line segment $\theta_{2lower}(r)$ and the lower circular arc $\theta_{1lower}(r)$;

establishing a polar coordinate equation of the two fillets as:

$$(x-x_0)^2 + (Y-y_0)^2 = R_0^2 \tag{22}$$

wherein (x,Y) are coordinates of any point on circles where the fillets are located, and $(x_0, y_0)$ are circle center coordinates of the circles where the fillets are located; and $R_0$ is a radius of each of the fillets;

establishing relational expressions among a plurality of variables $x_0$, $y_0$, $L_1$, $R_0$, $R_1$, $R_2$, $R_3$, $\beta$ as:

$$x_0 = \frac{-F - \sqrt{F^2 - 4EG}}{2E} \tag{23}$$

$$y_0 = tx_0 - R_0\sqrt{1+t^2} + R_2\left(\sin\frac{\pi}{n_b} - \cos\frac{\pi}{n_b}t\right) \tag{24}$$

$$E = t^2 + 1 \tag{25}$$

$$F = -2g + 2R_2\left(\sin\frac{\pi}{n_b} - \cos\frac{\pi}{n_b}t\right) - 2ht - 2R_0 t\sqrt{1+t^2} \tag{26}$$

$$G = R_0^2 t^2 + 2R_0 R_2\left(-\sqrt{1+t^2} \cdot \left(\sin\frac{\pi}{n_b} - \cos\frac{\pi}{n_b} \cdot t\right) + 2h\sqrt{1+t^2} + 2R_1\right) + \tag{27}$$

$$g^2 + h^2 + R_2^2\left(\sin\frac{\pi}{n_b} - \cos\frac{\pi}{n_b}t\right)^2 - 2R_2^2 h\left(\sin\frac{\pi}{n_b}\cos\frac{\pi}{n_b}t\right) - R_1^2$$

$$t = \tan\left(\frac{\pi}{n_b} - \beta\right) \tag{28}$$

$$g = L_1\cos\left(\frac{\pi}{2n_b}\right) \tag{29}$$

$$h = L_1\sin\left(\frac{\pi}{2n_b}\right) \tag{30}$$

wherein E, F, G, t, g and h are all intermediate variables;

calculating a mud throttling area $A(\phi)$ formed when the oscillating shear valve rotates:

$$A(\phi) = \tag{31}$$

$$\begin{cases} n_b(A_1(\phi) + A_2(\phi) - 2A_3) + A_{min} - 2A_5, & (0 < \phi \le \theta_1) \\ n_b(A_2(\phi) + A_4(\phi) - 2A_4) + A_{min}, & \left(\theta_1 < \phi \le 2\arctan\left(\frac{u}{l}\right) - \frac{\pi}{n_b}\right) \\ n_b A_6(\phi) + A_{min}, & \left(\left(2\arctan\left(\frac{u}{l}\right) - \frac{\pi}{n_b}\right) < \phi \le \left(2\arctan\left(\frac{v}{c}\right) - \frac{\pi}{n_b}\right)\right) \\ n_b A_7(\phi) + A_{min}, & \left(\left(2\arctan\left(\frac{v}{c}\right) - \frac{\pi}{n_b}\right) < \phi \le \theta_2\right) \\ A_{min}, & \left(\theta_2 < \phi \le \frac{\pi}{n_b}\right) \end{cases}$$

wherein $$A_1(\phi) = \frac{1}{2} \cdot \left(\frac{\pi}{n_b} - \phi\right) \cdot \left(\left(\frac{d}{2}\right)^2 - R_2^2\right) \tag{9}$$

$$A_2(\phi) = \int_{r_j(\phi)}^{R_2} 2(\theta_{1upper}(r) - \theta_{1upper}(r_j)) \cdot r \cdot dr \tag{10}$$

$$r_j(\phi) = \frac{L_1\cos\left(\frac{\phi}{2}\right) - \sqrt{4L_1^2\cos^2\left(\frac{\phi}{2}\right) - 4(L_1^2 - R_1^2)}}{2} \tag{11}$$

$$A_3 = \int_{R_2}^{\frac{D}{2}} \theta_{2lower}(r) \cdot r \cdot dr \tag{12}$$

$$A_{min} = \frac{\pi}{2}\left(\left(\frac{D}{2}\right)^2 - \left(\frac{d}{2}\right)^2\right) \tag{13}$$

$$A_4(\phi) = \int_{R_2}^{r_{max}(\phi)} 2(\theta_{2upper}(r) - \theta_{2upper}(r_{max}(\phi))) \cdot r \cdot dr \tag{14}$$

$$A_5 = A_{51} + A_{52} - A_{53} - A_{54} \tag{32}$$

-continued $$A_{51} = \frac{1}{2}\sqrt{l^2 + u^2} \frac{\left|\frac{u}{l}v - c\right|}{\sqrt{1 + (u/l)^2}} \quad (33)$$

$$A_{52} = \frac{1}{2}\sqrt{v^2 + c^2} \frac{\left|R_2\left(\cos\left(\frac{\pi}{n_b}\right) \cdot \frac{c}{v} - \sin\left(\frac{\pi}{n_b}\right)\right)\right|}{\sqrt{1 + \left(\frac{c}{v}\right)^2}} \quad (34)$$

$$A_{53} = \quad (35)$$
$$\frac{1}{2}R_2^2\left(\frac{\pi}{n_b} - \arctan\left(\frac{u}{l}\right)\right) - \int_{\sqrt{l^2+u^2}}^{R_2}\left(\theta_{1upper}(r) - \arctan\left(\frac{u}{l}\right)\right) \cdot r \cdot dr$$

$$A_{54} = \arcsin\left(0.5\frac{\sqrt{(v-l)^2 + (c-u)^2}}{R_0}\right) \cdot \quad (36)$$

$$r_{max}(\phi) = \frac{R_0\left(R_0 - \cos\left(\arcsin\left(0.5\frac{\sqrt{(v-l)^2+(c-u)^2}}{R_0}\right)\right)\right)\left(1 + \tan\left(\frac{\pi - n_b\phi}{4n_b}\right)\right) \cdot R_2 \cdot \tan(\beta)}{\left(1 - \tan\left(\frac{\pi - n_b\phi}{4n_b}\right)^2\right) \cdot \tan(\beta) - 2\tan\left(\frac{\pi - n_b\phi}{4n_b}\right)} \quad (15)$$

$$A_6(\phi) = A_{61}(\phi) + A_{62}(\phi) \quad (37)$$

$$A_{61}(\phi) = \frac{1}{2} \cdot \frac{\left|\tan\left(\frac{\phi}{2} + \frac{\pi}{2n_b}\right) \cdot v - c\right|}{\sqrt{\tan^2\left(\frac{\phi}{2} + \frac{\pi}{2n_b}\right)}} \cdot \sqrt{(a-j)^2 + (b-z)^2} \quad (38)$$

$$A_{62}(\phi) = R_0^2 \cdot \arcsin\left(\frac{\sqrt{(j-v)^2 + (z-c)^2}}{2R_0}\right) - \quad (39)$$
$$\frac{1}{2}\sqrt{(j-v)^2 + (z-c)^2} \cdot \sqrt{R_0^2 - \frac{(j-v)^2 + (z-c)^2}{4}}$$

$$A_7(\phi) = R_0^2 \arcsin\left(\frac{\sqrt{(j-o)^2 + (z-h)^2}}{2R_0}\right) - \quad (40)$$
$$\frac{1}{2}\sqrt{(j-o)^2 + (z-h)^2}\sqrt{R_0^2 - \frac{(j-o)^2 + (z-h)^2}{4}}$$

$$\theta_1 = 2\left(\frac{\pi}{n} + 2\left(\theta_{2upper}\left(\frac{D}{2}\right) + \frac{\pi}{n_b}\right)\right) - \frac{\pi}{n_b} \quad (41)$$

$$\theta_2 = 2\arctan\left(\max\left((x_0^2 - R_0^2)x^2 - 2x_0y_0x + y_0^2 - R_0^2 = 0\right)\right) - \frac{\pi}{n_b} \quad (42)$$

wherein $A_1$ is an annular area formed by taking the maximum polar radius $R_2$ as an internal radius and a radius $d/2$ of the rotator as an external radius and a differential angle between the angle of each of the valve orifices $\pi/n_0$ of the vans and the rotation angle $\phi$ as a central angle; $A_2$ is an area defined by the circular arc lines and a circle formed by taking the polar point O as a center and $R_2$ as a radius; $A_3$ is an area defined by an extension line of $R_2$ a circumferential line of the rotator and one of the straight line segments; $A_4$ is an area defined by the circle formed by taking the polar point O as the center and $R_2$ as the radius and the two straight line segments; $A_5$ is an area defined by the circular arc line, one fillet and one straight line segment and is segmented into four parts $A_{51}$, $A_{52}$, $A_{53}$ and $A_{54}$ to be calculated; $A_6$ is an area defined by the two fillets and the two straight line segments; $A_7$ is an area defined by the two fillets; $A_{min}$ is a minimum flow area of the oscillating shear valve; $\theta_1$ is a rotation angle when the oscillating shear valve rotates to a position where an end point of one straight line segment of the rotator coincides with an end point of one straight line segment of the stator; $\theta_2$ is a rotation angle when the oscillating shear valve rotates to a position where one fillet of the rotator is tangent to one fillet of the stator; (l,u) are coordinates of a tangent point of one fillet and the circular arc line; (v,c) are coordinates of a tangent point of one straight line segment and one fillet; (j,z) and (o,k) are coordinates of intersection points of a straight line taking a tangent value of the rotation angle as a slope and passing through the polar point O and a circle where one fillet is located; (a,b) are coordinates of an intersection point of a straight line where one straight line segment is located and a straight line passing through (j,z) and the polar point O; $r_j(\phi)$ and $r_{max}(\phi)$ are both intermediate variables; and D is an external diameter of the stator; and according to a relation between a thin-walled cutting edge fluid differential pressure $\Delta P(\phi)$ and the mud throttling area $A(\phi)$, establishing a relational expression between the mud throttling area and the fluid differential pressure as:

$$\Delta P(\phi) = \frac{\rho Q^2}{2C_d A(\phi)^2} \quad (16)$$

wherein $\rho$ is a density of mud, with a unit: $kg/m^3$; Q is a flow amount of a drilling fluid, with a unit: $m^3/s$; and $C_d$ is a flow coefficient which is 0.6-0.8;

determining the radius $R_1$ and the maximum polar radius $R_2$ of the circular arc line, the bending angle $\beta$ and the radius $R_0$ of each of the fillets by adopting a correlation coefficient index R of the fluid differential pressure $\Delta P(\phi)$ and a standard sinusoidal wave to complete design of the valve orifices of the oscillating shear valve; wherein the correlation coefficient index R is expressed as:

$$R = \frac{\int_0^T \Delta P(\phi) \times \Delta P_0(\phi) d\phi}{\sqrt{\int_0^T \Delta P^2(\phi)} \times \sqrt{\int_0^T \Delta P_0^2(\phi)}} \quad (17)$$

wherein $\Delta P_0(\phi)$ is a standard sinusoidal pressure wave signal, and T is a differential pressure signal period of the valve orifices of the oscillating shear valve.

In some embodiments of the present application, the external diameter of the stator is 5-10 mm larger than an external diameter of the rotator.

Compared with the prior art, the present application has the advantages and positive effects as below.

In the present application, sector-based valve orifices of oscillating shear valve of the continuous pulse generator is optimized by finely analyzing a motion characteristic of the oscillating shear valve, thus a highly similar sinusoidal pressure signal of which a correlation coefficient is up to 0.9999 can be provided for the continuous pulse generator. Therefore, a signal transmitted to the ground by a pipeline is low in harmonic component proportion, concentrated in energy and low in amplitude attenuation, which makes the signal arriving at the ground low in distortion degree and high in quality and intensity, so that the difficulty in detecting the ground signal is lowered, the transmission distance of the signal is extended, and thus it has an important application value. In addition, a valve body of the optimized oscillating shear valve is easier to process.

BRIEF DESCRIPTION OF DRAWINGS

FIG. 1 is a schematic structural diagram of valve orifices of a sector-circular arc-straight line oscillating shear valve in an embodiment of the present application;

FIG. 2a is a schematic diagram of a throttling area of valve orifices when a rotator rotates for relative to a stator in an embodiment of the present application;

FIG. 2b is a schematic diagram of a throttling area of valve orifices when a rotator rotates for 4° relative to a stator in an embodiment of the present application;

FIG. 2c is a schematic diagram of a throttling area of valve orifices when a rotator rotates for 22° relative to a stator in an embodiment of the present application;

FIG. 2d is a schematic diagram of a throttling area of valve orifice when a rotator rotates for 30° relative to a stator in an embodiment of the present application;

FIG. 3 is a schematic diagram of a differential pressure of a sector-circular arc-straight line oscillating shear valve in an embodiment of the present application;

Figure 4:
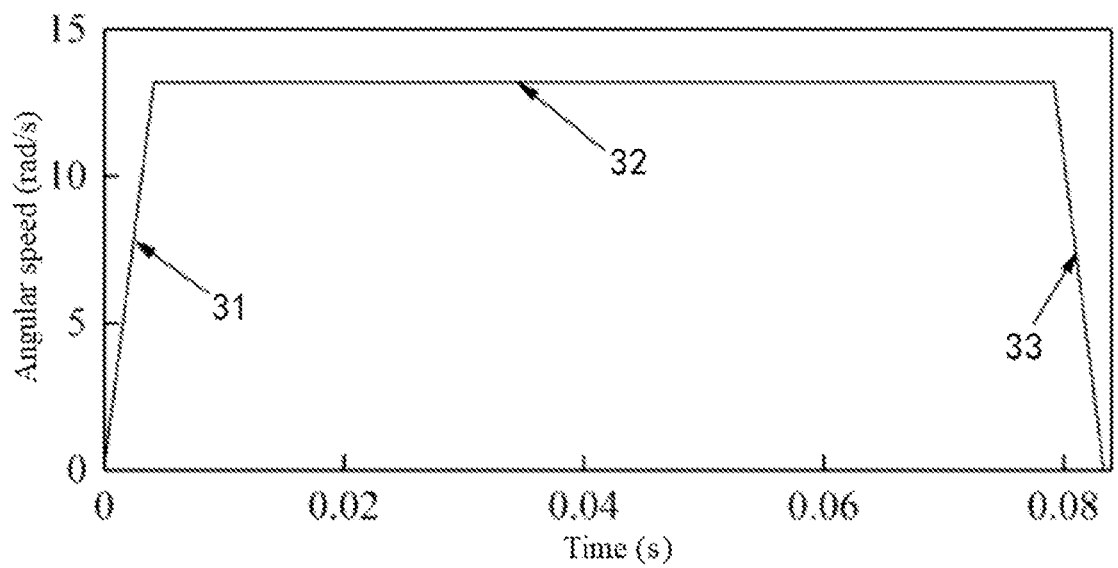
FIG. 4 is a schematic diagram of angular speed variation of a sector-circular arc-straight line oscillating shear valve in an embodiment of the present application.

In the drawings, 11, circular arc line; 12, straight line segment; 21, standard sinusoidal pressure signal; 22, pressure signal of oscillating shear valve during constant-speed rotating; 23, valley signal; 31, acceleration stage; 32, constant-speed stage; 33, deceleration stage; 41, relation curve showing that correlation coefficient R of differential pressure signal of oscillating shear valve during variable-speed rotating varies with constant-speed time $t_u$ when $T=\frac{1}{8}s$; 42, relation curve showing that correlation coefficient $R_1$ of differential pressure signal of oscillating shear valve during variable-speed rotating varies with constant-speed time $t_u$ when $T=\frac{1}{8}s$; 43, relation curve showing that correlation coefficient R of differential pressure signal of oscillating shear valve during variable-speed rotating varies with constant-speed time $t_u$ when $T=\frac{1}{12}s$; 44, relation curve showing that correlation coefficient $R_1$ of differential pressure signal of oscillating shear valve during variable-speed rotating varies with constant-speed time $t_u$ when $T=\frac{1}{12}s$; 45, relation curve showing that correlation coefficient R of differential pressure signal of oscillating shear valve during variable-speed rotating varies with constant-speed time $t_u$ when $T=\frac{1}{16}s$; 46, relation curve showing that correlation coefficient R 1 of differential pressure signal of oscillating shear valve during variable-speed rotating varies with constant-speed time $t_u$ when $T=\frac{1}{16}s$; 51, circular arc line; 52, straight line segment; 53, fillet; 61, standard sinusoidal pressure signal; 62, pressure signal of oscillating shear valve during variable-speed rotating; 7, rotator; 71, valve orifice of van; 72, vane of rotator; 73, spline; 8, stator; 81, internal end surface; 82, external end surface; 83, vane of stator; 84, conical head; 85, screw hole; 86, open angle; and 87, blind hole.

DETAILED DESCRIPTION OF THE EMBODIMENTS

The technical solutions in the embodiments will be described clearly and completely below with reference to the accompanying drawings. Apparently, embodiments to be described in the specific implementations are merely some but not all of the embodiments of the present application.

Based on the embodiments of the present application, all other embodiments obtained by those of ordinary skill in the art without creative efforts shall fall within the protection scope of the present application.

The implementations described below are merely intended to describe preferred implementations of the present application, rather than to limit the scope of the present application.

Various modifications and improvements may be made on the technical solutions of the present application by those skilled in the art without departing from the design spirit of the present application shall fall within the protection scope determined by the claims of the present application.

It should be noted that, in the description of the present application, directional or positional relationships indicated by terms such as "inner", and "outer" are based on directional or positional relationships as shown in the accompanying drawings, and are only for the purposes of facilitating and simplifying the descriptions, rather than indicating or implying that the referred apparatus or element has to have a specific direction or be constructed and operated in the specific direction, and therefore, they cannot be regarded as limitations on the present application.

Oscillating shear valves provided in embodiments of the present application are divided into the following two types according to different valve orifices:

(1) sector-circular arc-straight line oscillating shear valve: each of valve orifices between vans comprising one circular arc line and two straight line segments; and (2) sector-circular arc-straight line-fillet oscillating shear valve: each of valve orifices between vans comprising one circular arc line, two straight line segments and two fillets, and the fillets being tangent to the circular arc line and the straight line segments at the same time.

Embodiment 1

The present embodiment provides a design method for valve orifices of the above-mentioned sector-circular arc-straight line oscillating shear valve, comprising the following steps:

(1) a characteristic equation of rotation angular displacement of a rotator is established according to an angular speed of the rotator during constant-speed rotating, wherein the characteristic equation is expressed as:

$$\phi = \omega_u t \quad (1)$$

wherein $\phi$ is the rotation angular displacement of the rotator, i.e., a rotation angle; $\omega_u$ is the angular speed of the rotator during constant-speed rotating, with a unit: rad/s; and t is constant-speed rotation time;

(2) polar coordinate equations of the circular arc line are established:

as shown in FIG. 1, the circular arc line is in a first quadrant, the circular arc line is divided into an upper circular arc $\theta_{1upper}(r)$ and a lower circular arc $\theta_{1lower}(r)$ by taking a midpoint of the circular arc line as a boundary, and polar coordinate equations of the upper circular arc $\theta_{1upper}(r)$ and the lower circular arc $\theta_{1lower}(r)$ are respectively established as:

$$\theta_{1upper}(r) = \alpha_0 + \arccos\left(\frac{L_1 + r^2 - R_1}{2rL_1}\right), r \in [R_3, R_2] \quad (2)$$

$$\theta_{1lower}(r) = \alpha_0 - \arccos\left(\frac{L_1^2 + r^2 - R_1}{2rL_1}\right), r \in [R_3, R_2] \quad (3)$$

wherein r is a polar radius of any point on the circular arc line, and $R_1$ is a radius of the circular arc line; $R_2$ is a maximum polar radius of the circular arc line and is equal to a length of a connecting line segment between a polar point and an upper end point or a lower end point of the circular arc line; $R_3$ is a minimum polar radius of the circular arc line and is equal to a length of a connecting line segment between the polar point and the midpoint of the circular arc line; $L_1$ is a polar radius of a center of a circle of the circular arc line;

$$\alpha_0 = \frac{\pi}{2n_b}$$

is a polar angle corresponding to $R_3$; and $n_b$ is a number of vanes of the oscillating shear valve;

(3) relational expressions among $L_1$, $R_1$, $R_2$ and $R_3$ are established:

$$L_1 = R_1 + R_3 \quad (4)$$

$$\cos\frac{\pi}{2n_b} = \frac{R_2^2 + L_1^2 - R_1^2}{2R_2 L_1} \quad (5)$$

(4) polar coordinate equations of the two straight line segments are established:

the polar coordinate equations of an upper straight line segment $\theta_{2upper}(r)$ and a lower straight line segment $\theta_{2lower}(r)$ are respectively established as:

$$\theta_{2upper}(r) = \frac{\pi}{n_b} - 2\arctan\left(\frac{-2r + \sqrt{4r^2 - 4\tan^2(\beta)(R_2^2 - r^2)}}{2(r + R_2)\tan(\beta)}\right) \quad (6)$$

$$\theta_{2lower}(r) = 2\arctan\left(\frac{-2r + \sqrt{4r^2 - 4\tan^2(\beta)(R_2^2 - r^2)}}{2(r + R_2)\tan(\beta)}\right) \quad (7)$$

wherein $\beta$ is a bending angle formed by the upper straight line segment $\theta_{2upper}(r)$ and the upper circular arc $\theta_{1upper}(r)$ or the lower straight line segment $\theta_{2lower}(r)$ and the lower circular arc $\theta_{1lower}(r)$;

(5) a mud throttling area $A(\phi)$ formed when the oscillating shear valve rotates is expressed as:

$$A(\phi) = \begin{cases} n_b(A_1(\phi) + A_2(\phi) - 2A_3) + A_{min}, & (0 < \phi \leq \theta_1) \\ n_b(A_2(\phi) + A_4(\phi)) + A_{min}, & \left(\theta_1 < \phi \leq \frac{\pi}{n_b}\right) \end{cases} \quad (8)$$

wherein $$A_1(\phi) = \frac{1}{2} \cdot \left(\frac{\pi}{n_b} - \phi\right) \cdot \left(\left(\frac{d}{2}\right)^2 - R_2^2\right) \quad (9)$$

$$A_2(\phi) = \int_{r_j(\phi)}^{R_2} 2(\theta_{1+}(r) - \theta_{1+}(r_j)) \cdot r \cdot dr \quad (10)$$

$$r_j(\phi) = \frac{L_1 \cos\left(\frac{\phi}{2}\right) - \sqrt{4L_1^2 \cos^2\left(\frac{\phi}{2}\right) - 4(L_1^2 - R_1^2)}}{2} \quad (11)$$

$$A_3 = \int_{R_2}^{\frac{D}{2}} \theta_{2\dagger}(r) \cdot r \cdot dr \quad (12)$$

$$A_{min} = \frac{\pi}{2}\left(\left(\frac{D}{2}\right)^2 - \left(\frac{d}{2}\right)^2\right) \quad (13)$$

$$A_4(\phi) = \int_{R_2}^{r_{max}(\phi)} 2(\theta_{2+}(r) - \theta_{2+}(r_{max}(\phi))) \cdot r \cdot dr \quad (14)$$

$$r_{max}(\phi) = \frac{\left(1 + \tan\left(\frac{\pi - n_b\phi}{4n_b}\right)\right) \cdot R_2 \cdot \tan(\beta)}{\left(1 - \tan\left(\frac{\pi - n_b\phi}{4n_b}\right)^2\right) \cdot \tan(\beta) - 2\tan\left(\frac{\pi - n_b\phi}{4n_b}\right)} \quad (15)$$

wherein as shown in FIG. 2a to FIG. 2d, $A_1$ is an annular area formed by taking the maximum polar radius $R_2$ as an internal radius and the radius d/2 of the rotator as an external radius and a differential angle between an angle of each of the valve orifices $\pi/n_b$ and the rotation angle $\phi$ as a central angle; $A_2$ is an area defined by circular arc lines, that is, the upper circular arc of the stator and the lower circular arc of the rotator, and a circle formed by taking a polar point O as a center of the circle and $R_2$ as a radius; $A_3$ is an area defined by an extension line of $R_2$, a circumferential line of the rotator and one of the straight line segments; $A_4$ is an area defined by the circle formed by taking the polar point O as the center and $R_2$ as the radius and the two straight line segments, that is, one straight line segment of the rotator and one straight line segment of the stator; $A_{min}$ is a minimum flow area of the oscillating shear valve; $\theta_1$ is a rotation angle when the oscillating shear valve rotates to a position where an end point of one straight line segment of the rotator coincides with an end point of one straight line segment of the stator; $r_j(\phi)$ and $r_{max}(\phi)$ are both intermediate variables; and D is an external diameter of the stator; and (6) according to a relation between a thin-walled cutting edge fluid differential pressure $\Delta P(\phi)$ and the mud throttling area $A(\phi)$, a relational expression between the mud throttling area and the fluid differential pressure is established as:

$$\Delta P(\phi) = \frac{\rho Q^2}{2C_d A(\phi)^2} \quad (16)$$

wherein $\rho$ is a density of mud, with a unit: $kg/m^3$; Q is a flow amount of a drilling fluid, with a unit: $m^3/s$; and $C_d$ is a flow coefficient which is 0.6-0.8;

the radius $R_1$ and the maximum polar radius $R_2$ of the circular arc line and the bending angle $\beta$ are determined by adopting a correlation coefficient index R of the fluid differential pressure $\Delta P(\phi)$ and a standard sinusoidal wave to complete the design of the valve orifices of the oscillating shear valve; wherein the correlation coefficient index R is expressed as:

$$R = \frac{\int_0^T \Delta P(\phi) \times \Delta P_0(\phi) d\phi}{\sqrt{\int_0^T \Delta P^2(\phi)} \times \sqrt{\int_0^T \Delta P_0^2(\phi)}} \quad (17)$$

wherein $\Delta P_0(\phi)$ is a standard sinusoidal pressure wave signal, and T is a differential pressure signal period of the valve orifices of the oscillating shear valve.

Specifically, in this step, a plurality of values of $R_2$ are selected within a value range of $R_2$ for each value of $R_2$, $\beta$ is traversed within a value range of $\beta$, the correlation coefficient R of the differential pressure $\Delta P(\phi)$ generated under each value is calculated, a value of $\beta$ and a value of $R_2$ of a point with the maximum correlation coefficient R are preferably selected, and then, the value of $R_1$ is determined according to the above-mentioned formulae (4) and (5).

In addition, according to an attenuation law in a downhole signal uploading process, a peak value of a differential pressure peak of a signal generated by the oscillating shear valve needs to be greater than 1.7 MPa so that the intensity of the signal uploaded to the ground is satisfied.

The oscillating shear valve designed by the design method in the present embodiment can generate a continuous pressure wave signal of which the correlation coefficient is up to 0.9999, and has great practical significance.

Embodiment 2

The present embodiment provides a sector-circular arc-straight line oscillating shear valve of a continuous pulse generator, comprising a rotator and a stator which are coaxially mounted, wherein the stator and the rotator have the same number $n_b$ of vanes and valve orifices with same structures between the vans. With reference to FIG. 1, each of the valve orifices comprises a circular arc line 11 and two straight line segments 12, an angle of each of the valve orifices of the vans is $\pi/n_b$, and a structure of each valve orifice are designed according to the design method in embodiment 1.

Figure 12A:
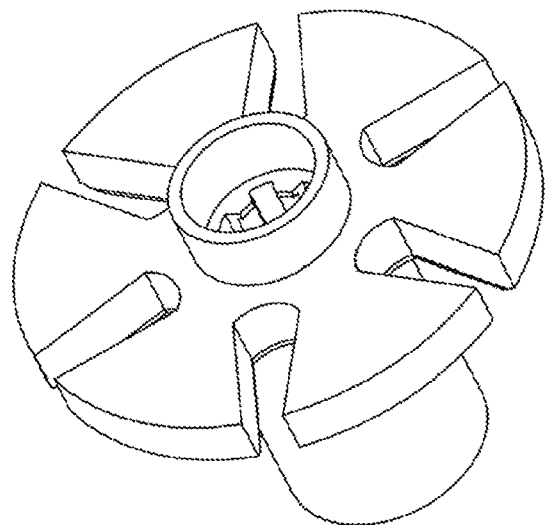
FIG. 12a is a schematic structural diagram of a rotator of an oscillating shear valve in embodiment 2 of the present application.
Figure 12B:
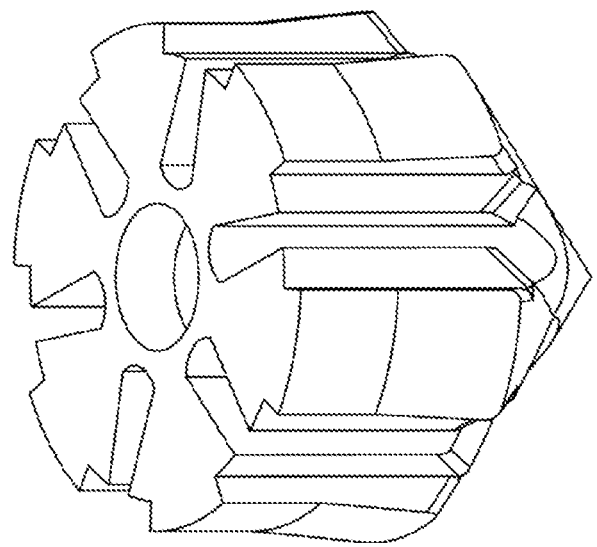
FIG. 12b is a schematic structural diagram of a stator of an oscillating shear valve in embodiment 2 of the present application.

Specifically, the oscillating shear valve in the present embodiment is optimally designed by adopting the design method in embodiment 1 under the following preset conditions: the number of vanes of each of the rotator and the stator is 6, that is, $n_b=6$, the minimum polar radius of the circular arc line $R_3$ of each oscillating shear valve orifice is 16 mm, an external diameter d of the rotator of the oscillating shear valve is 76 mm, and an external diameter D of the stator of the oscillating shear valve is 86 mm; a differential pressure signal period T, i.e., a continuous mud pulse signal period, of valve orifices is $\frac{1}{12}$s; an angular speed $\omega_u$ of constant-speed rotation of the rotator is 12.56 rad/s; and a state that the valve orifices of the stator and the valve orifices of the rotator completely overlap is set as an initial position of the oscillating shear valve, at the moment, the oscillating shear valve has the maximum flow area. For the oscillating shear valve orifice optimized by adopting the design method in embodiment 1, the radius $R_1$ of the circular arc line is 6.32 mm, the maximum polar radius $R_2$ of the circular arc line is 19 mm, the minimum polar radius $R_3$ of the circular arc line is 16 mm, the bending angle $\beta$ of each of the straight line segments is 20.5°. After the optimized design, the schematic structural diagram of the rotator is shown as FIG. 12a, and the schematic structural diagram of the stator is shown as FIG. 12b.

It should be noted that, in values of the above-mentioned parameters, the value of $R_3$ can be determined by those skilled in the art according to an actual situation. For example, in the present embodiment, in view of aesthetics and practicality, the value of $R_3$ is taken as 16 mm, and the value of the external diameter D of the stator is determined according to the structure of an actually selected device; and the external diameter d of the rotator is determined according to the external diameter D of the stator and is generally 5-10 mm smaller than D based on experience; and in the present embodiment, the pulse period is taken as $\frac{1}{12}$s, and $$\omega_u = \frac{2\pi}{nT} = 12.56 \text{ rad/s}.$$

After the above-mentioned parameters are determined, values of $R_1$, $R_2$, $R_3$ and $\beta$ are determined by adopting the design method in embodiment 1 so that an optimally designed valve orifice is obtained.

With reference to FIGS. 2a-2d, shades in the figures represent the flow area of the oscillating shear valve; the oscillating shear valve rotates according to a set rotating speed, and when the rotator rotates for 0° relative to the stator, that is, an end surface of the stator completely coincides with an end surface of the rotator, the oscillating shear valve has the maximum flow area; with the continuous rotation of the rotator, the flow area of the oscillating shear valve is gradually reduced; and when the rotator rotates for 30° relative to the stator, that is, the end surface of the stator does not coincide with the end surface of the rotator at all, the oscillating shear valve has the minimum flow area $A_{min}$.

With reference to FIG. 3, dotted line 21 represents a standard sinusoidal pressure signal, solid line 22 represents a pressure signal generated by the sector-circular arc-straight line oscillating shear valve in the present embodiment, and it can be seen from the figure that the solid line 22 almost overlaps with the dotted line 21. The oscillating shear valve provided in the embodiment of the present application can generate a pressure signal of which the correlation coefficient is up to 0.9999, the maximum differential pressure is 2.49 MPa, the minimum differential pressure is 0.36 mPa, and a peak value of a differential pressure peak is 2.1 MPa, wherein the "peak value of the differential pressure peak" in the present application means a distance between a peak and a valley.

Embodiment 3

In the present embodiment, a variable-speed motion state of the oscillating shear valve in embodiment 2 is optimized by the specific steps:

(1) with reference to FIG. 4, a speed variation period comprises an acceleration stage 31, a constant-speed stage 32 and a deceleration stage 33, within one speed variation period $T_e$, acceleration time $t_u$ is equal to deceleration time $t_d$, and a characteristic equation of a rotating speed 11 of the oscillating shear valve is established, wherein the characteristic equation is expressed as:

$$n = \begin{cases} \dfrac{n_d}{t_0} \cdot t, & (t < t_a) \\ n_d, & (t_a < t \le (t_u + t_a)) \\ -\dfrac{n_d}{t_a} \cdot t + T \cdot \left(\dfrac{n_d}{t_a}\right), & ((t_u + t_a) < t \le T_e) \end{cases} \quad (18)$$

wherein $n_d$ is a rotating speed of the oscillating shear valve at a constant-speed stage, with a unit: r/min; $t_a$ is uniform acceleration time of the oscillating shear valve, with a unit: s; $t_u$ is constant-speed time of the oscillating shear valve, with a unit: s; $T_e$ is one speed variation period, i.e., the time that the oscillating shear valve does reciprocating motion to undergo acceleration-constant-speed-deceleration once, with a unit: s: t is rotation time; and T is a differential pressure signal period of each valve orifice of the oscillating shear valve;

(2) a characteristic equation of an angular speed ω of the oscillating shear valve is established, wherein the characteristic equation is expressed as:

$$\omega = \dfrac{2\pi n}{60} \quad (19)$$

(3) a characteristic equation of rotation angular displacement of the rotator is established according to the angular speed ω of the oscillating shear valve, wherein the characteristic equation is expressed as:

$$\phi = \begin{cases} 0.5\omega t, & (t \le t_a) \\ \dfrac{n_d \cdot t_a \cdot \pi}{60} \cdot \omega \cdot (t - t_a), & (t_a < t \le (t_u + t_a)) \\ \dfrac{n_d \cdot t_a \cdot \pi}{60} + \dfrac{2\pi \cdot n_d \cdot t_u}{60} + \left(\omega + \dfrac{2\pi n}{60}\right) \cdot \dfrac{(t - t_a - t_u)}{2}, \\ \qquad ((t_u + t_a) < t \le T_e) \end{cases} \quad (20)$$

wherein $\phi$ is the rotation angular displacement of the rotator, i.e., a rotation angle;

(4) a polar coordinate equation of the circular arc line is established:

as shown in FIG. 1, the circular arc line is set in a first quadrant, the circular arc line is divided into an upper circular arc $\theta_{1upper}(r)$ and a lower circular arc $\theta_{1lower}(r)$ by taking a midpoint of the circular arc line as a boundary, and polar coordinate equations of the upper circular arc $\theta_{1upper}(r)$ and the lower circular arc $\theta_{1lower}(r)$ are respectively established as:

$$\theta_{1upper}(r) = \alpha_0 + \arccos\left(\dfrac{L_1 + r^2 - R_1}{2rL_1}\right), \, r \in [R_3, R_2] \quad (2)$$

$$\theta_{1lower}(r) = \alpha_0 - \arccos\left(\dfrac{L_1^2 + r^2 - R_1}{2rL_1}\right), \, r \in [R_3, R_2] \quad (3)$$

wherein r is a polar radius of any point on the circular arc line, and $R_1$ is a radius of the circular arc line; $R_2$ is a maximum polar radius of the circular arc line and is equal to a length of a connecting line segment between a polar point and an upper end point or a lower end point of the circular arc line; $R_3$ is a minimum polar radius of the circular arc line and is equal to a length of a connecting line segment between the polar point and the midpoint of the circular arc line; $L_1$ is a polar radius of a center of a circle of the circular arc line;

$$\alpha_0 = \dfrac{\pi}{2n_b}$$

is a polar angle corresponding to $R_3$; and $n_b$, is a number of vanes of the oscillating shear valve;

(5) relational expressions among $L_1$, $R_1$, $R_2$ and $R_3$ are established:

$$L_1 = R_1 + R_3 \quad (4)$$

$$\cos\dfrac{\pi}{2n_b} = \dfrac{R_2^2 + L_1^2 - R_1^2}{2R_2L_1} \quad (5)$$

(6) polar coordinate equations of the two straight line segments are established:
the polar coordinate equations of an upper straight line segment $\theta_{2upper}(r)$ and a lower straight line segment $\theta_{2lower}(r)$ are respectively established as:

$$\theta_{2upper}(r) = \dfrac{\pi}{n_b} - 2\arctan\left(\dfrac{-2r + \sqrt{4r^2 - 4\tan^2(\beta)(R_2^2 - r^2)}}{2(r + R_2)\tan(\beta)}\right) \quad (6)$$

$$\theta_{2lower}(r) = 2\arctan\left(\dfrac{-2r + \sqrt{4r^2 - 4\tan^2(\beta)(R_2^2 - r^2)}}{2(r + R_2)\tan(\beta)}\right) \quad (7)$$

wherein β is a bending angle formed by the upper straight line segment $\theta_{2upper}(r)$ and the upper circular arc $\theta_{1upper}(r)$ or the lower straight line segment $\theta_{2lower}(r)$ and the lower circular arc $\theta_{1lower}(r)$;

(7) a mud throttling area A(ϕ) formed when the oscillating shear valve rotates is expressed as:

$$A(\phi) = \begin{cases} n_b(A_1(\phi) + A_2(\phi) - 2A_3) + A_{min}, & (0 < \phi \le \theta_1) \\ n_b(A_2(\phi) + A_4(\phi)) + A_{min}, & \left(\theta_1 < \phi \le \dfrac{\pi}{n_b}\right) \end{cases} \quad (8)$$

wherein

-continued $$A_1(\phi) = \frac{1}{2} \cdot \left(\frac{\pi}{n_b} - \phi\right) \cdot \left(\left(\frac{d}{2}\right)^2 - R_2^2\right) \quad (9)$$

$$A_2(\phi) = \int_{r_j(\phi)}^{R_2} 2(\vartheta_{1\vdash}(r) - \vartheta_{1\vdash}(r_j)) \cdot r \cdot dr \quad (10)$$

$$r_j(\phi) = \frac{L_1 \cos\left(\frac{\phi}{2}\right) - \sqrt{4L_1^2 \cos^2\left(\frac{\phi}{2}\right) - 4(L_1^2 - R_1^2)}}{2} \quad (11)$$

$$A_3 = \int_{R_2}^{\frac{D}{2}} \theta_{2\uparrow}(r) \cdot r \cdot dr \quad (12)$$

$$A_{min} = \frac{\pi}{2}\left(\left(\frac{D}{2}\right)^2 - \left(\frac{d}{2}\right)^2\right) \quad (13)$$

$$A_4(\phi) = \int_{R_2}^{r_{max}(\phi)} 2(\vartheta_{1\vdash}(r) - \vartheta_{1\vdash}(r_{max}(\phi))) \cdot r \cdot dr \quad (14)$$

$$r_{max}(\phi) = \frac{\left(1 + \tan\left(\frac{\pi - n_b\phi}{4n_b}\right)\right) \cdot R_2 \cdot \tan(\beta)}{\left(1 - \tan\left(\frac{\pi - n_b\phi}{4n_b}\right)^2\right) \cdot \tan(\beta) - 2\tan\left(\frac{\pi - n_b\phi}{4n_b}\right)} \quad (15)$$

wherein $A_1$ is an annular area formed by taking the maximum polar radius $R_2$ as an internal radius and the radius $d/2$ of the rotator as an external radius and a differential angle between an angle of each of the valve orifices $\pi/n_b$ and the rotation angle $\phi$ as a central angle; $A_2$ is an area defined by the circular arc lines, that is, the upper circular arc of the stator and the lower circular arc of the rotator, and a circle formed by taking a polar point O as a center of the circle and $R_2$ as a radius; $A_3$ is an area defined by an extension line of $R_2$ a circumferential line of the rotator and one of the straight line segments; $A_4$ is an area defined by the circle formed by taking the polar point O as the center and $R_2$ as the radius and the two straight line segments, that is, one straight line segment of the rotator and one straight line segment of the stator; $A_{min}$ is a minimum flow area of the oscillating shear valve; $\theta_1$ is a rotation angle when the oscillating shear valve rotates to a position where an end point of one straight line segment of the rotator coincides with an end point of one straight line segment of the stator; $r_j(\phi)$ and $r_{max}(\phi)$ are both intermediate variables; and D is an external diameter of the stator; and (8) according to a relation between a thin-walled cutting edge fluid differential pressure $\Delta P(\phi)$ and the mud throttling area $A(\phi)$, a relational expression between the mud throttling area and the fluid differential pressure is established as:

$$\Delta P(\phi) = \frac{\rho Q^2}{2C_d A(\phi)^2} \quad (16)$$

wherein $\rho$ is a density of mud, with a unit: kg/m³; Q is a flow amount of a drilling fluid, with a unit: m³/s; and $C_d$ is a flow coefficient which is 0.6-0.8;

a speed variation ratio p and a speed variation period $T_e$ of the variable-speed motion of the oscillating shear valve are determined by adopting a correlation coefficient index $R_1$ of the fluid differential pressure $\Delta P(\phi)$ and a standard sinusoidal wave to complete the optimization of the variable-speed motion state of the oscillating shear valve; wherein the speed variation ratio p is a ratio of speed variation time to the speed variation period, that is, $p=(T_e - t_u)/T_e$; and the coefficient index $R_1$ is expressed as:

$$R_l = \frac{\int_0^{T_2} \Delta P_2(\phi) \times \Delta P_0(\phi) dt}{\sqrt{\int_0^{T_2} \Delta P_2^2(\phi)} \times \sqrt{\int_0^{T_2} \Delta P_0^2(\phi)}} \quad (21)$$

wherein $\Delta P_2(\phi)$ is a differential pressure signal at valley of the valve orifices during variable-speed motion of the oscillating shear valve; $\Delta P_0(\phi)$ is a standard sinusoidal pressure wave signal, and $T_2 = t(\theta_1)$ is a time when the oscillating shear valve rotates to the angle $\theta_1$, i.e., the time corresponding to the differential pressure signal at valley during variable-speed motion of the oscillating shear valve.

The determining method for the speed variation ratio p and the speed variation period T e in this step is the same as the determining method for the values of $\beta$ and $R_2$ in embodiment 1, and will not be repeated herein.

It should be noted that the variable-speed motion of the oscillating shear valve may affect the form and correlation coefficient of the differential pressure signal of the valve orifices of oscillating shear valve to a certain extent, wherein a variation rate of the throttling area of the valve orifices may be reduced during the acceleration stage and the deceleration stage, and then, a variation rate of the differential pressure signal of the valve orifices may be reduced. With reference to FIG. 3, a differential pressure signal at valley of the sector-circular arc-straight line valve orifice varies too fast, and a waveform has a certain defect on the valley (that is, solid line 22 on the position of the valley is slightly deviated from dotted line 21). Therefore, the speed variation period $T_e = T$ is adopted, the variation rate of the differential pressure signal at valley of the valve orifice is reduced by acceleration and deceleration, and thus, the correlation coefficient of the differential pressure signal at valley of the valve orifice is increased without affecting a correlation coefficient at peak.

Figure 5:
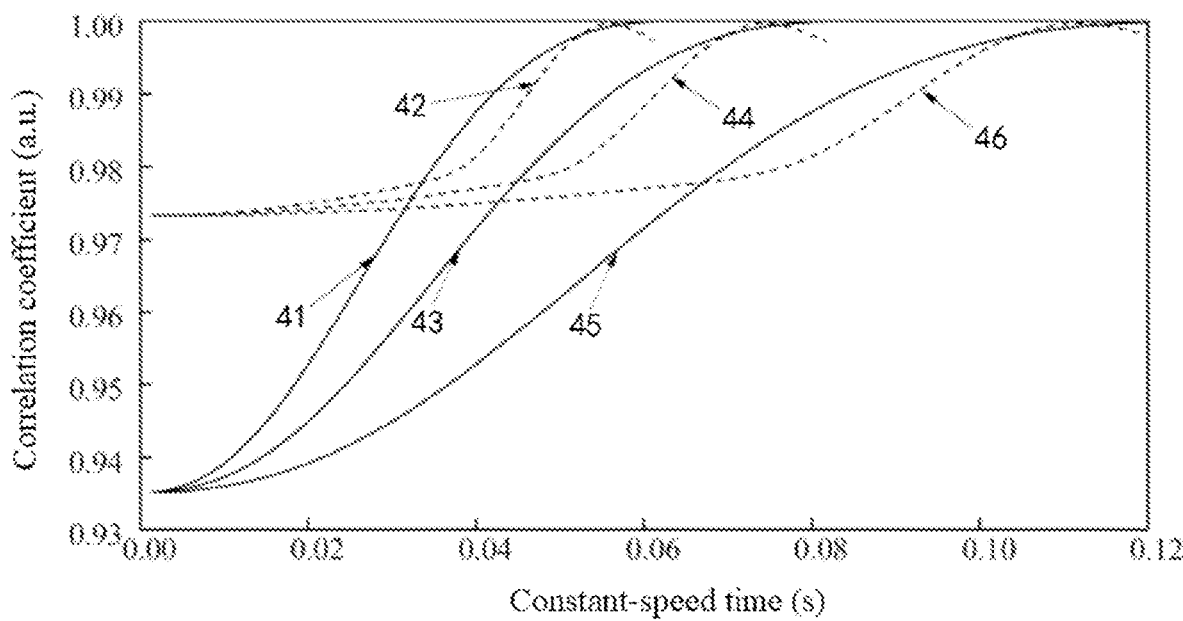
FIG. 5 is a schematic diagram of a relationship between a correlation coefficient of a differential pressure signal generated by an oscillating shear valve and constant-speed time $t_u$ when $T_e = T$ in an embodiment of the present application.

Variation of correlation coefficients R and $R_1$ of the differential pressure signal of the valve orifice with the constant-speed time $t_u$ within different periods refers to FIG. 5, wherein curves 41, 43 and 45 respectively represent variation relation curves that the correlation coefficient R of the differential pressure signal during variable-speed motion of the oscillating shear valve varies with the constant-speed time $t_u$ when the period T=⅛s, 1/12s and 1/16s; and curves 42, 44 and 46 respectively represent variation relation curves that the correlation coefficient $R_1$ of the differential pressure signal during variable-speed motion of the oscillating shear valve varies with the constant-speed time $t_u$ when the period T=⅛s, 1/12s and 1/16s. Take variation of the correlation coefficients R and $R_1$ with the constant-speed time $t_u$ when the period T=1/12s in FIG. 5 as examples (i.e., curves 43 and 44 in FIG. 5), the constant-speed time $t_u$=0.075 s on a peak value of the curve 44 that the correlation coefficient $R_1$ varies with the constant-speed time $t_u$ is preferred as an optimal constant-speed time, at the moment, the correlation coefficient $R_1$ of the differential pressure signal at valley of the sector-circular arc-straight line oscillating shear valve is up to the peak value, i.e., 0.9999, but the correlation coefficient R is not up to the peak value, and by appropriately increasing the bending angle $\beta$ to 22°, the correlation coefficient R can be up to the peak value, i.e., 0.9999. Therefore, the speed variation ratio p of the oscillating shear valve in the variable-speed motion state is preferred as 1:10.

The oscillating shear valve described in the present embodiment can not only effectively avoid a jamming phenomenon brought by particles in drilling fluid, but also realize more efficient coding communication due to cyclical motion characteristics, which is conducive to the increase of the transmission rate of downhole data. The oscillating shear valve can generate a continuous pressure wave signal of which the correlation coefficient is up to 0.9999, and has a high sinusoidal similarity, which means that a signal transmitted to the ground by a pipeline is few in harmonic components, concentrated in energy and high in intensity, which is conductive to the detection of the uploaded signal and great in practical significance.

Embodiment 4

Figure 6:
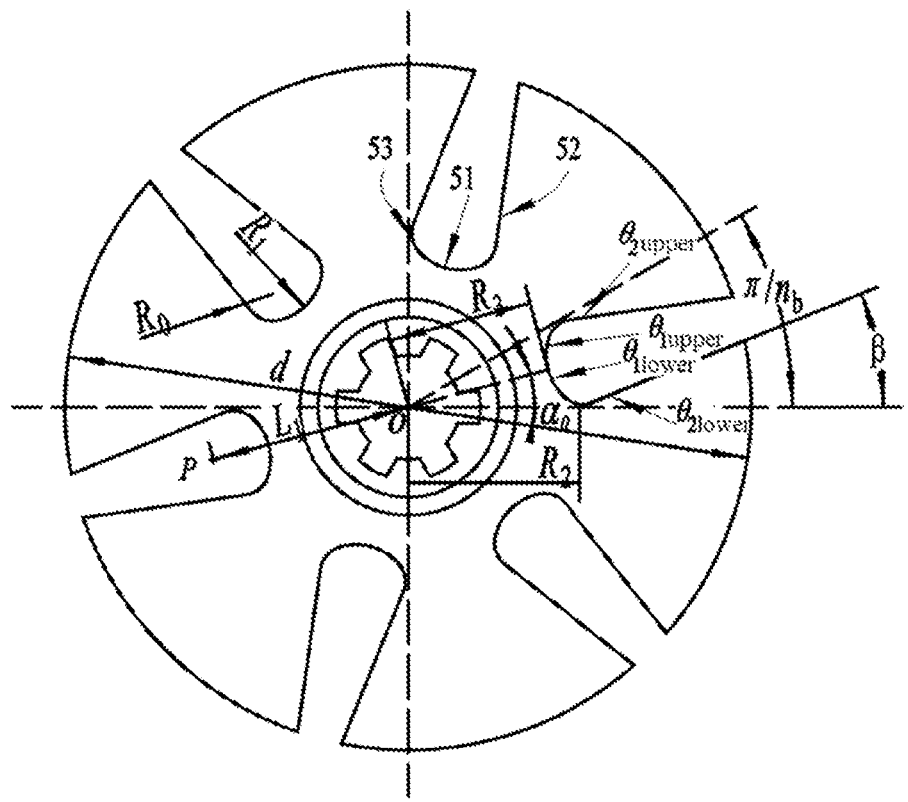
FIG. 6 is a schematic structural diagram of valve orifices of a sector-circular arc-straight line-fillet oscillating shear valve in an embodiment of the present application.

The present application provides a design method for valve orifices of the above-mentioned sector-circular arc-straight line-fillet oscillating shear valve, comprising following steps:

(1) a characteristic equation of rotation angular displacement of the rotator is established according to an angular speed of the rotator during constant-speed rotating, wherein the characteristic equation is expressed as:

$$\phi = \omega_u t \tag{1}$$

wherein $\phi$ is the rotation angular displacement of the rotator, i.e., a rotation angle; $\omega_u$ is the angular speed of the rotator during constant-speed rotating, with a unit: rad/s; and t is constant-speed rotation time;

(2) polar coordinate equations of the circular arc line are established:

as shown in FIG. 6, the circular arc line is in a first quadrant, the circular arc line is divided into an upper circular arc $\theta_{1upper}(r)$ and a lower circular arc $\theta_{1lower}(r)$ by taking a midpoint of the circular arc line as a boundary, and polar coordinate equations of the upper circular arc $\theta_{1upper}(r)$ and the lower circular arc $\theta_{1lower}(r)$ are respectively established as:

$$\theta_{1upper}(r) = \alpha_0 + \arccos\left(\frac{L_1^2 + r^2 - R_1}{2rL_1}\right), r \in [R_3, R_2] \tag{2}$$

$$\theta_{1lower}(r) = \alpha_0 - \arccos\left(\frac{L_1^2 + r^2 - R_1}{2rL_1}\right), r \in [R_3, R_2] \tag{3}$$

wherein r is a polar radius of any point on the circular arc line, and $R_1$ is a radius of the circular arc line; $R_2$ is a maximum polar radius of the circular arc line and is equal to a length of a connecting line segment between a polar point and an upper end point or a lower end point of the circular arc line; $R_3$ is a minimum polar radius of the circular arc line and is equal to a length of a connecting line segment between the polar point and the midpoint of the circular arc line; $L_1$ is a polar radius of a center of a circle of the circular arc line;

$$\alpha_0 = \frac{\pi}{2n_b}$$

is a polar angle corresponding to $R_3$; and $n_b$ is a number of vanes of the oscillating shear valve;

(3) polar coordinate equations of the two straight line segments are established:

the polar coordinate equations of an upper straight line segment $\theta_{2upper}(r)$ and a lower straight line segment $\theta_{2lower}(r)$ are respectively established as:

$$\theta_{2upper}(r) = \frac{\pi}{n_b} - 2\arctan\left(\frac{-2r + \sqrt{4r^2 - 4\tan^2(\beta)(R_2^2 - r^2)}}{2(r + R_2)\tan(\beta)}\right) \tag{6}$$

$$\theta_{2lower}(r) = 2\arctan\left(\frac{-2r + \sqrt{4r^2 - 4\tan^2(\beta)(R_2^2 - r^2)}}{2(r + R_2)\tan(\beta)}\right) \tag{7}$$

wherein $\beta$ is a bending angle formed by the upper straight line segment $\theta_{2upper}(r)$ and the upper circular arc $\theta_{1upper}(r)$ or the lower straight line segment $\theta_{2lower}(r)$ and the lower circular arc $\theta_{1lower}(r)$;

(4) a polar coordinate equation of the two fillets is established as:

$$(x-x_0)^2 + (y-y_0)^2 = R_0^2 \tag{22}$$

wherein (x,Y) are coordinates of any point on circles where the fillets are located, and $(x_0, y_0)$ are circle center coordinates of the circles where the fillets are located; and $R_0$ is a radius of each of the fillets;

relational expressions among a plurality of variables $x_0$, $y_0$, $L_1$, $R_0$, $R_1$, $R_2$, $R_3$, $\beta$ are established as:

$$x_0 = \frac{-F - \sqrt{F^2 - 4EG}}{2E} \tag{23}$$

$$y_0 = tx_0 - R_0\sqrt{1+t^2} + R_2\left(\sin\frac{\pi}{n_b} - \cos\frac{\pi}{n_b}t\right) \tag{24}$$

$$E = t^2 + 1 \tag{25}$$

$$F = -2g + 2R_2t\left(\sin\frac{\pi}{n_b} - \cos\frac{\pi}{n_b}t\right) - 2ht - 2R_0t\sqrt{1+t^2} \tag{26}$$

$$G = R_0^2 t^2 + 2R_0 R_2\left(-\sqrt{1+t^2} \cdot \left(\sin\frac{\pi}{n_b} - \cos\frac{\pi}{n_b} \cdot t\right) + 2h\sqrt{1+t^2} + 2R_1\right) + \tag{27}$$

$$g^2 + h^2 + R_2^2\left(\sin\frac{\pi}{n_b} - \cos\frac{\pi}{n_b}t\right)^2 - 2R_2^2 h\left(\sin\frac{\pi}{n_b} - \cos\frac{\pi}{n_b}t\right) - R_1^2$$

$$t = \tan\left(\frac{\pi}{n_b} - \beta\right) \tag{28}$$

$$g = L_1 \cos\left(\frac{\pi}{2n_b}\right) \tag{29}$$

$$h = L_1 \sin\left(\frac{\pi}{2n_b}\right) \tag{30}$$

wherein E, F, G, t, g and h are all intermediate variables;

(5) a mud throttling area $A(\phi)$ formed when the oscillating shear valve rotates is expressed as:

$$A(\phi) = \tag{31}$$

$$\begin{cases} n_b(A_1(\phi) + A_2(\phi) - 2A_3 - 2A_5) + A_{min}, (0 < \phi \le \theta_1) \\ n_b(A_2(\phi) + A_4(\phi) - 2A_5) + A_{min}, \left(\theta_1 < \phi \le 2\arctan\left(\frac{u}{l}\right) - \frac{\pi}{n_b}\right) \\ n_b A_6(\phi) + A_{min}, \left(\left(2\arctan\left(\frac{u}{l}\right) - \frac{\pi}{n_b}\right) < \phi \le \left(2\arctan\left(\frac{v}{c}\right) - \frac{\pi}{n_b}\right)\right) \\ n_b A_7(\phi) + A_{min}, \left(\left(2\arctan\left(\frac{v}{c}\right) - \frac{\pi}{n_b}\right) < \phi \le \theta_2\right) \\ A_{min}, \left(\theta_2 < \phi \le \frac{\pi}{n_b}\right) \end{cases}$$

wherein $$A_1(\phi) = \frac{1}{2} \cdot \left(\frac{\pi}{n_b} - \phi\right) \cdot \left(\left(\frac{d}{2}\right)^2 - R_2^2\right) \tag{9}$$

Figure 8:
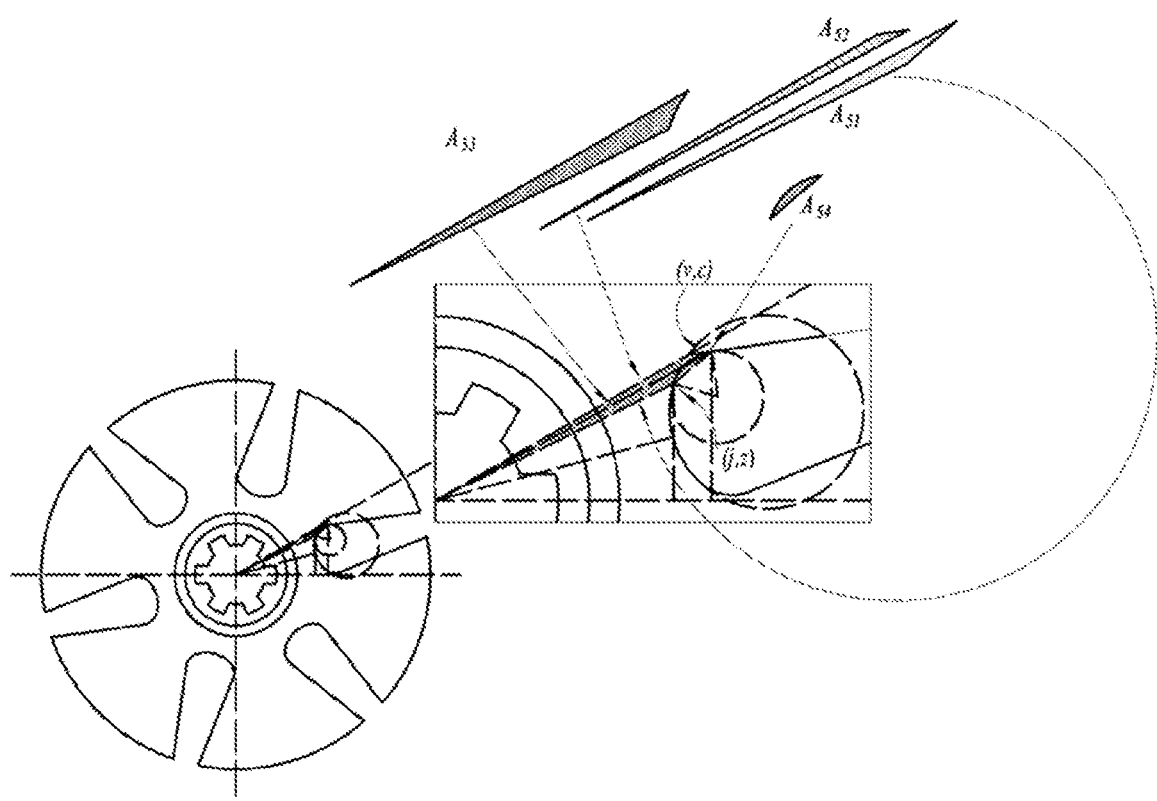
FIG. 8 is a schematic diagram of $A_{51}$, $A_{52}$, $A_{53}$ and $A_{54}$ in an embodiment of the present application.
Figure 9:
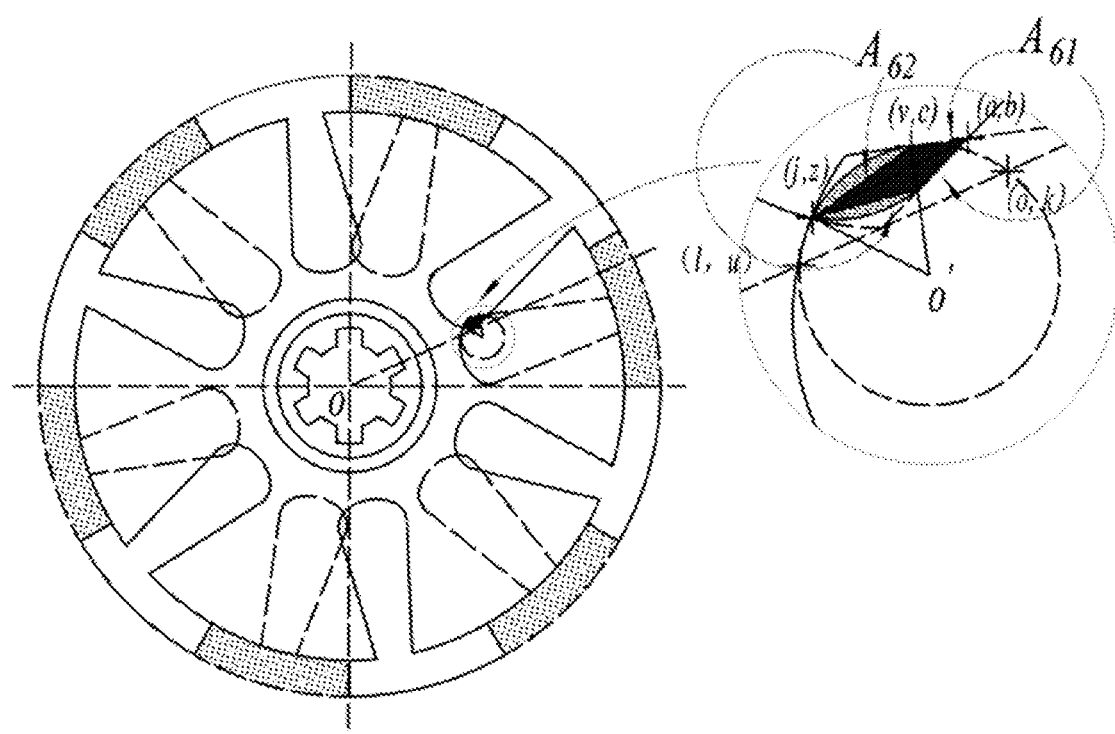
FIG. 9 is a schematic diagram of $A_{61}$ and $A_{62}$ in an embodiment of the present application.
Figures 10A, 10B:
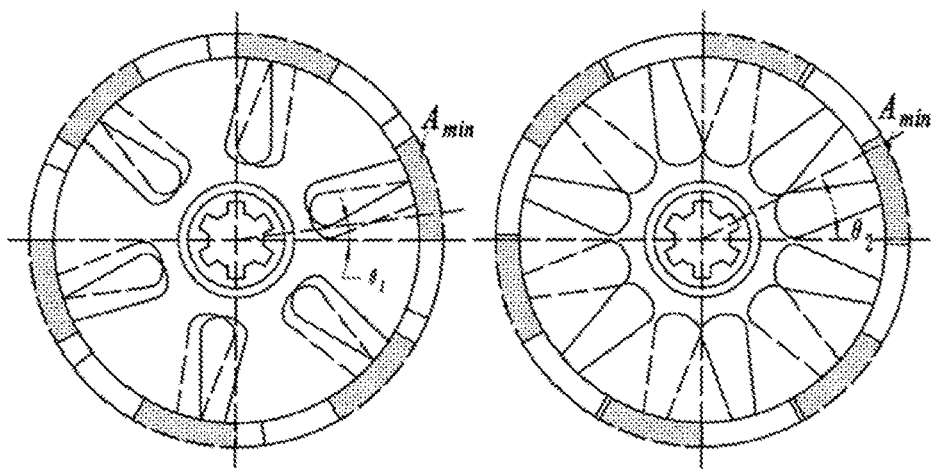
FIG. 10a is a schematic diagram when the oscillating shear valve rotates to a position that the rotation angle is equal to $\theta_1$.
FIG. 10b is a schematic diagram when the oscillating shear valve rotates to a position that a rotation angle is equal to $\theta_2$.

-continued $$A_1(\phi) = \int_{r_j}^{R_2} 2(\vartheta_{1+}(r) - \vartheta_{1+}(r_j)) \cdot r \cdot dr \quad (10)$$

$$r_j(\phi) = \frac{L_1\cos\left(\frac{\phi}{2}\right) - \sqrt{4L_1^2\cos^2\left(\frac{\phi}{2}\right) - 4(L_1^2 - R_1^2)}}{2} \quad (11)$$

$$A_3 = \int_{R_2}^{\frac{D}{2}} \vartheta_{2+}(r) \cdot r \cdot dr \quad (12)$$

$$A_{min} = \frac{\pi}{2}\left(\left(\frac{D}{2}\right)^2 - \left(\frac{d}{2}\right)^2\right) \quad (13)$$

$$A_4(\phi) = \int_{R_2}^{r_{max}(\phi)} 2(\vartheta_{2+}(r) - \vartheta_{2+}(r_{max}(\phi))) \cdot r \cdot dr \quad (14)$$

$$A_4' = n_b(A_2(\phi) + A_4(\phi) - 2A_5) + A_{min}, \left(\theta_1 < \phi \le 2\arctan\left(\frac{u}{l}\right) - \frac{\pi}{n_b}\right) \quad (43)$$

$$A_5 = A_{51} + A_{52} - A_{53} - A_{54} \quad (32)$$

$$A_{51} = \frac{1}{2}\sqrt{l^2 + u^2} \frac{\left|\frac{u}{l}v - c\right|}{\sqrt{1 + (u/l)^2}} \quad (33)$$

$$A_{52} = \frac{1}{2}\sqrt{v^2 + c^2} \frac{\left|R - 2\right|\left(\cos\left(\frac{\pi}{n_b}\right) \cdot \frac{c}{v} - \sin\left(\frac{\pi}{n_b}\right)\right)}{\sqrt{1 + \left(\frac{c}{v}\right)^2}} \quad (34)$$

$$A_{53} = \frac{1}{2}R_2^2\left(\frac{\pi}{n_b} - \arctan\left(\frac{u}{l}\right)\right) - \int_{\sqrt{l^2+u^2}}^{R_2}\left(\theta_{1\square}(r) - \arctan\left(\frac{u}{l}\right)\right) \cdot r \cdot dr \quad (35)$$

$$A_{54} = \arcsin\left(0.5\frac{\sqrt{(v-j)^2 + c - z)^2}}{R_0}\right) \cdot \quad (36)$$

$$R_0\left(R_0 - \cos\left(\arcsin\left(0.5\frac{\sqrt{(v-j)^2 + c - z)^2}}{R_0}\right)\right)\right)$$

$$r_{max}(\phi) = \frac{\left(1 + \tan\left(\frac{\pi - n_b\phi}{4n_b}\right)\right) \cdot R_2 \cdot \tan(\beta)}{\left(1 - \tan\left(\frac{\pi - n_b\phi}{4n_b}\right)^2\right) \cdot \tan(\beta) - 2\tan\left(\frac{\pi - n_b\phi}{4n_b}\right)} \quad (15)$$

$$A_6(\phi) = 2(A_{61}(\phi) + A_{62}(\phi)) \quad (37)$$

$$A_{61}(\phi) = \frac{1}{2} \cdot \frac{\left|\tan\left(\frac{\phi}{2} + \frac{\pi}{2n_b}\right) \cdot v - c\right|}{\sqrt{\tan^2\left(\frac{\phi}{2} + \frac{\pi}{2n_b}\right)}} \cdot \sqrt{(a-j)^2 + (b-z)^2} \quad (38)$$

$$A_{62}(\phi) = R_0^2 \cdot \arcsin\left(\frac{\sqrt{(j-v)^2 + (z-c)^2}}{2R_0}\right) - \quad (39)$$

$$\frac{1}{2}\sqrt{(j-v)^2 + (z-c)^2} \cdot \sqrt{R_0^2 - \frac{\sqrt{(j-v)^2 + (z-c)^2}}{4}}$$

$$A_7(\phi) = R_0^2\arcsin\left(\frac{\sqrt{(l-o)^2 + (u-h)^2}}{2R_0}\right) - \quad (40)$$

$$\frac{1}{2}\sqrt{(l-o)^2 + (u-h)^2}\sqrt{R_0^2 - \frac{(l-o)^2 + (u-h)^2}{4}}$$

$$\theta_1 = 2\left(\frac{\pi}{n_b} + 2\left(\theta_{2+}\left(\frac{D}{2}\right) + \frac{\pi}{n_b}\right)\right) - \frac{\pi}{n_b} \quad (41)$$

$$\theta_2 = 2\arctan\left(\max\left((x_0^2 - R_0^2)x^2 - 2x_0y_0x + y_0^2 - R_0^2 = 0\right)\right) - \frac{\pi}{n_b} \quad (42)$$

wherein $A_1$ is an annular area formed by taking the maximum polar radius $R_2$ as an internal radius and the radius d/2 of the rotator as an external radius and a differential angle $\delta$ between an angle of each of the valve orifices $\pi/n_b$, and the rotation angle $\phi$ as a central angle, with reference to FIG. 2b; $A_2$ is an area defined by circular arc lines, that is, the upper circular arc of the stator and the lower circular arc of the rotator, and a circle formed by taking a polar point O as a center of the circle and $R_2$ as a radius, with reference to FIG. 2b; $A_3$ is an area defined by an extension line of $R_2$ a circumferential line of the rotator and one of the straight line segments, with reference to FIG. 2b; $A_4$ is an area defined by the circle formed by taking the polar point O as the center and $R_2$ as the radius, two straight line segments, that is, one straight line segment of the rotator and one straight line segment of the stator, and two fillets, that is, one fillet of the rotator and one fillet of the stator, with reference to FIG. 7c; $A_5$ is an area defined by the circular arc line, one fillet and one straight line segment, specially defined by a circle where the circular arc line of the stator located, one fillet of the stator and a straight line where one straight line segment of the stator located, and $A_5$ is segmented into four parts $A_{51}$, $A_{52}$, $A_{53}$ and $A_{54}$ to be calculated, with reference to FIG. 7b and FIG. 8; $A_6$ is an area defined by two fillets and two straight line segments, that is, one fillet and one straight line segment of the rotator and one fillet and one straight line segment of the stator, with reference to FIG. 7d, and $A_6$ is segmented into two parts $A_{61}$ and $A_{62}$ to be calculated, with reference to FIG. 9; A, is an area defined by the two fillets, that is, one fillet of the rotator and one fillet of the stator, with reference to FIG. 7e; $A_{min}$ is a minimum flow area of the oscillating shear valve, with reference to FIG. 7f; $\theta_1$ is a rotation angle when the oscillating shear valve rotates to a position where an end point of one straight line segment of the rotator coincides with an end point of one straight line segment of the stator, with reference to FIG. 10a; $\theta_2$ is a rotation angle when the oscillating shear valve rotates to a position where one fillet of the rotator is tangent to one fillet of the stator, with reference to FIG. 10b; (j,z) are coordinates of a tangent point of one fillet and the circular arc line, with reference to FIG. 8 and FIG. 9; (v,c) are coordinates of a tangent point of one straight line segment and one fillet, with reference to FIG. 8 and FIG. 9; (l,u) and (o,k) are coordinates of intersection points of a straight line taking a tangent value of the rotation angle as a slope and passing through the polar point O and a circle where one fillet is located, with reference to FIG. 9; (a,b) are coordinates of an intersection point of one straight line segment of the stator and one straight line segment of the rotator, with reference to FIG. 9; $r_j(\phi)$ and $r_{max}(\phi)$ are both intermediate variables; and D is an external diameter of the stator; and (6) according to a relation between a thin-walled cutting edge fluid differential pressure $\Delta P(\phi)$ and the mud throttling area $A(\phi)$, a relational expression between the mud throttling area and the fluid differential pressure is established as:

$$\Delta P(\phi) = \frac{\rho Q^2}{2C_d A(\phi)^2} \quad (16)$$

wherein $\rho$ is a density of mud, with a unit: kg/m$^3$; Q is a flow amount of a drilling fluid, with a unit: m$^3$/s; and $C_d$ is a flow coefficient which is 0.6-0.8;

the radius $R_1$ and the maximum polar radius $R_2$ of the circular arc line, the bending angle $\beta$ and the radius $R_0$ of each of the filles of the valve orifice are determined by adopting a correlation coefficient index R of the fluid differential pressure $\Delta P(\phi)$ and a standard sinusoidal wave to complete the design of the valve orifices of the oscillating shear valve; wherein the correlation coefficient index R is expressed as:

$$R = \frac{\int_0^T \Delta P(\phi) \times \Delta P_0(\phi) d\phi}{\sqrt{\int_0^T \Delta P^2(\phi)} \times \sqrt{\int_0^T \Delta P_0^2(\phi)}} \quad (17)$$

wherein $\Delta P_0(\phi)$ is a standard sinusoidal pressure wave signal, and T is a differential pressure signal period of the valve orifices of the oscillating shear valve.

The determining method the above-mentioned parameters in this step are the same as the determining method for in embodiment 1, and will not be repeated herein.

The oscillating shear valve designed by the design method in the present embodiment can generate a continuous pressure wave signal of which the correlation coefficient is up to 0.9999, and has great practical significance.

The present embodiment further provides a non-transferrable computer readable storage medium storing computer instructions which are executable by a processor, wherein the computer instructions are configured to enable a computer to execute steps of the aforementioned design method for valve orifices of the sector-circular arc-straight line-fillet oscillating shear valve.

Embodiment 5

The embodiment of the present application provides a sector-circular arc-straight line-fillet oscillating shear valve of a continuous pulse generator. Compared with the oscillating shear valve in embodiment 2, the oscillating shear valve in the present embodiment is additionally provided with fillets between the circular arc line and each of the straight line segments. Specifically, the oscillating shear valve in the present embodiment comprises a rotator and a stator which are coaxially mounted, wherein the stator and the rotator have the same number $n_b$ of vanes and valve orifices with same structures between the vans. With reference to FIG. 6, each of the valve orifices comprises a circular arc line 51, two straight line segments 52 and two fillets 53, each fillets is tangent to the circular arc line 51 and one of the straight line segments 52, an angle of each of the valve orifices of the vans is $\pi/n_b$, and a structure of each valve orifice is designed according to the design method in embodiment 4.

Specifically, the oscillating shear valve in the present embodiment is optimally designed by adopting the design method in embodiment 4 under the following preset conditions: the number of vanes of each of the rotator and the stator is 6, that is, $n_b$=6, the minimum polar radius $R_3$ of the circular arc line of each oscillating shear valve orifice is 16 mm, an external diameter d of the rotator of the oscillating shear valve is 76 mm, and an external diameter D of the stator of the oscillating shear valve is 86 mm; a differential pressure signal period T, i.e., a continuous mud pulse signal period, of the valve orifices is ¹⁄₁₂s; and a state that the valve orifices of the stator and the valve orifices of the rotator completely overlap is set as an initial position of the oscillating shear valve, at the moment, the oscillating shear valve has the maximum flow area. For the oscillating shear valve orifice optimized by adopting the design method in embodiment 4, the radius $R_1$ of the circular arc line is 6.32 mm, the maximum polar radius $R_2$ of the circular arc line is 19 mm, the minimum polar radius $R_3$ of the circular arc line is 16 mm, the bending angle $\beta$ of each of the straight line segments is 22°, and the radius $R_0$ of each of the fillets is 3 mm. In addition, the speed variation ratio p of the oscillating shear valve in the variable-speed motion state is preferred as 1:10, and the speed variation period $T_e$=T is adopted, the variation rate of the differential pressure signal of the valve orifice at the valley is reduced by acceleration and deceleration, and thus, the correlation coefficient of the differential pressure signal of the valve orifice at the valley is increased without affecting a correlation coefficient at a peak.

Figure 7A:
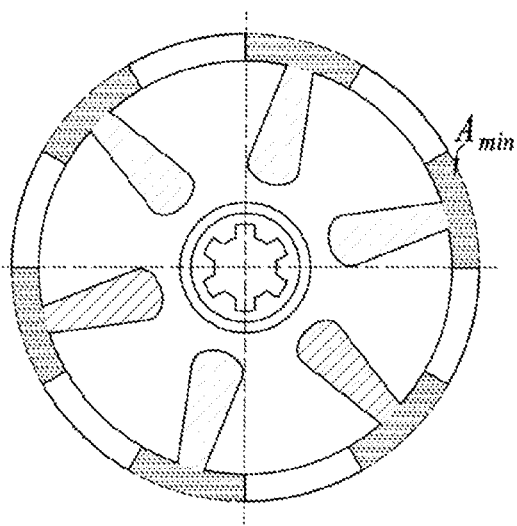
FIG. 7a is a schematic diagram of a throttling area of valve orifices when a rotator rotates for 0° relative to a stator in an embodiment of the present application.
Figure 7B:
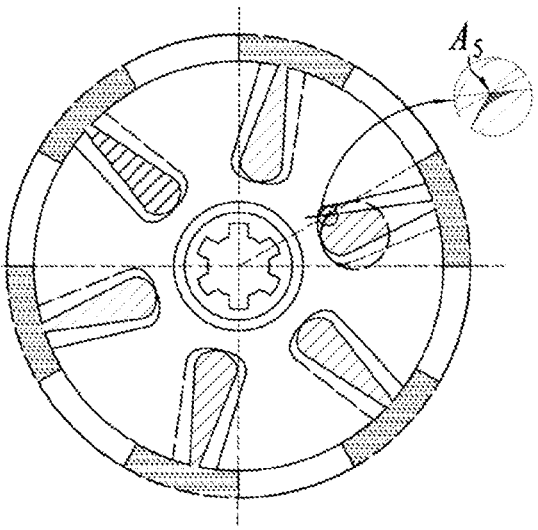
FIG. 7b is a schematic diagram of a throttling area of valve orifices when a rotator rotates for 5° relative to a stator in an embodiment of the present application.
Figure 7C:
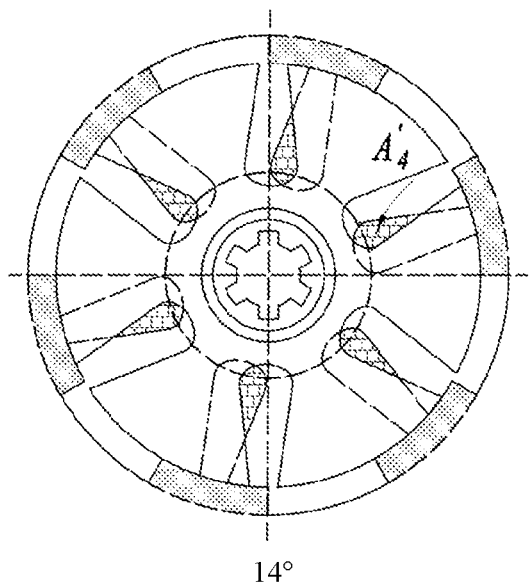
FIG. 7c is a schematic diagram of a throttling area of valve orifices when a rotator rotates for 14° relative to a stator in an embodiment of the present application.
Figure 7D:
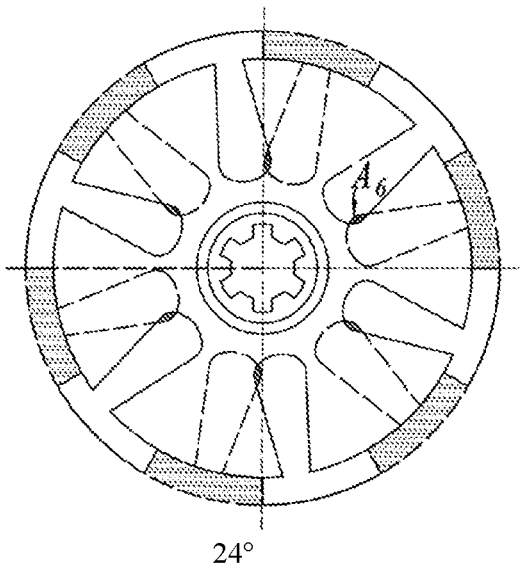
FIG. 7d is a schematic diagram of a throttling area of valve orifices when a rotator rotates for 24° relative to a stator in an embodiment of the present application.
Figure 7E:
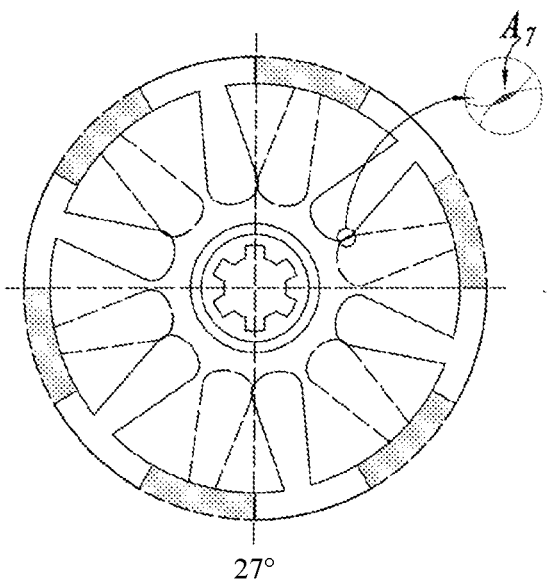
FIG. 7e is a schematic diagram of a throttling area of valve orifices when a rotator rotates for 27° relative to a stator in an embodiment of the present application.
Figure 7F:
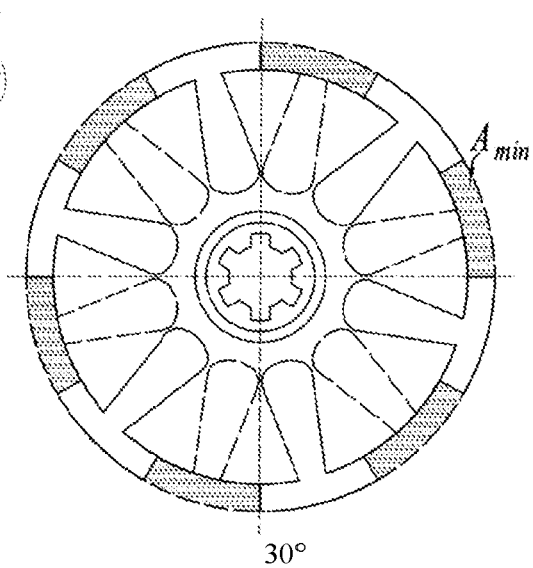
FIG. 7f is a schematic diagram of a throttling area of valve orifices when a rotator rotates for 30° relative to a stator in an embodiment of the present application.

With reference to FIGS. 7a-7f, shades in the figures represent the flow area of the oscillating shear valve; the oscillating shear valve rotates according to a set rotating speed, as shown in FIG. 7a, a state that an end surface of the stator completely coincides with an end surface of the rotator is an initial state of the valve, at the moment, the rotator rotates for 0° relative to the stator, and the oscillating shear valve has the maximum flow area; with the continuous rotation of the rotator, the flow area of the oscillating shear valve is gradually reduced; and when the rotator rotates for 30° relative to the stator, that is, the end surface of the stator does not coincide with the end surface of the rotator at all, the oscillating shear valve has the minimum flow area A.

Figure 11:
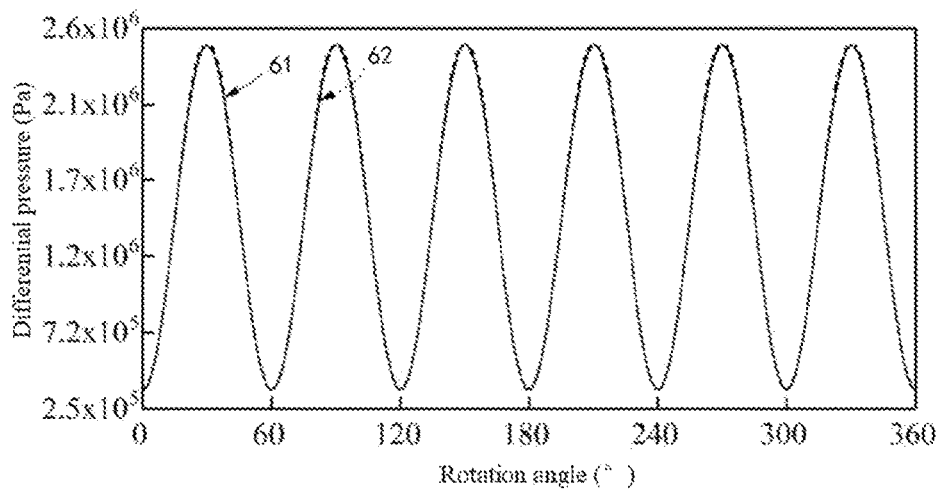
FIG. 11 is a schematic diagram of a differential pressure of a sector-circular arc-straight line-fillet oscillating shear valve in an embodiment of the present application.

With reference to FIG. 11, dotted line 61 represents a standard sinusoidal pressure signal, solid line 62 represents a pressure signal generated by the sector-circular arc-straight line-fillet oscillating shear valve in the present embodiment, and it can be seen from the figure that solid line 62 almost overlaps with dotted line 61. The oscillating shear valve provided in the present embodiment can generate a pressure signal of which the correlation coefficient is up to 0.9999, the maximum differential pressure is 2.49 MPa, the minimum differential pressure is 0.4 MPa, and a peak value of a differential pressure peak is 2.0 MPa.

Figure 13A:
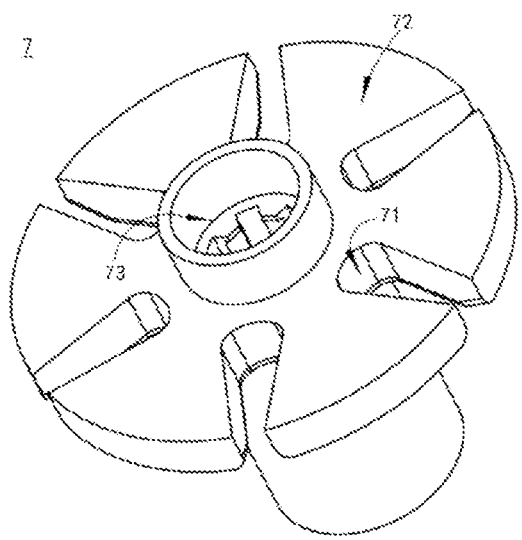
FIG. 13a is a schematic structural diagram of a rotator of an oscillating shear valve in embodiment 5 of the present application.

Specifically, with reference to FIG. 13a, in the present embodiment, the rotator consists of six vanes 72, an angle of the valve orifice 71 between two adjacent vanes of the rotator is $\pi/6$, the minimum polar radius $R_3$ of the circular arc line of each of the valve orifices of the rotator is 16 mm, and an external diameter d of the rotator is 76 mm; and a spline 73 for transferring a torque is designed in a center of the rotator.

Figure 13B:
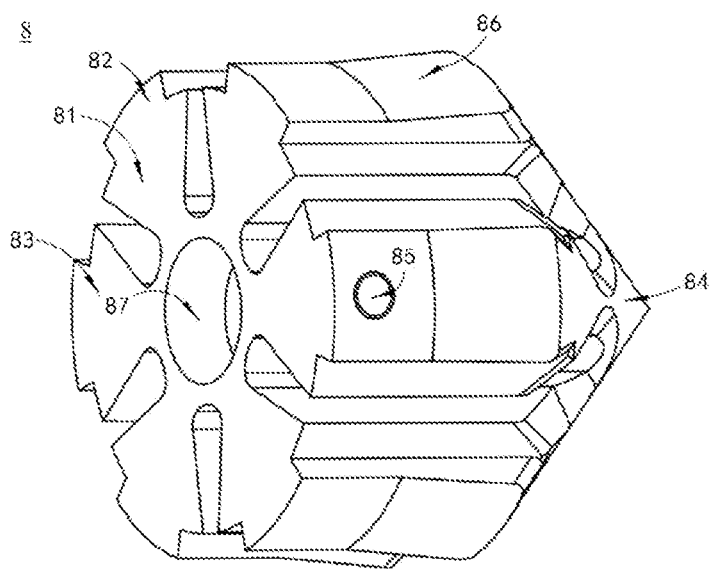
FIG. 13b is a schematic structural diagram of a stator of an oscillating shear valve in embodiment 5 of the present application.

Specifically, with reference to FIG. 13b, in the present embodiment, the stator 8 comprises six vanes 83; an end surface of the stator may be divided into an internal end surface 81 and external end surfaces 82, wherein a shape of the internal end surface 81 is completely consistent to the end surface of the rotator, each of the external end surfaces 82 is formed by half of a ring formed by external diameters of the stator and the rotator, and the external end surfaces are uniformly distributed on the six vanes; a conical head 84 is disposed on a top of a center of the stator; screw holes 85 are formed in sides of two opposite vanes of the stator; a 5° open angle 86 is disposed on a fluid facing end surface on each of the vans of the stator; a blind hole 87 for mounting a transmission shaft is formed in a center of a bottom of the stator; and an external diameter D of the stator is 86 mm.

The oscillating shear valve in the present embodiment can generate a continuous pressure wave signal of which the correlation coefficient is up to 0.9999, and has great practical significance.

The above-mentioned embodiments are intended to explain the present application, rather than to limit the present application. Any modifications and changes for the present application within the spirit of the present application and the protection scope of the claims fall within the protection scope of the present application.

The invention claimed is:

1. An oscillating shear valve of a continuous pulse generator, comprising:
a rotator and a stator which are coaxially mounted, wherein the stator and the rotator have a same number $n_b$ of vanes and valve orifices with same structures between the vans, wherein $n_b$=4, 6, 8; each of the valve orifices comprises a circular arc line, two straight line segments and two fillets, each fillet is tangent to the circular arc line and one of the straight line segments, an angle of each valve orifice of the vans is $\pi/n_b$, and a structure of each valve orifice is designed according to following method:
establishing a characteristic equation of rotation angular displacement of the rotator according to an angular speed of the rotator during constant-speed rotating, wherein the characteristic equation is expressed as:

$$\phi = \omega_u t \qquad (1)$$

wherein $\phi$ is the rotation angular displacement of the rotator, that is, a rotation angle; $\omega_u$ is the angular speed of the rotator during constant-speed rotating, with a unit: rad/s; and t is constant-speed rotation time;
setting the circular arc line within a first quadrant, dividing the circular arc line into an upper circular arc $\theta_{1upper}(r)$ and a lower circular arc $\theta_{1lower}(r)$ by taking a midpoint of the circular arc line as a boundary, and respectively establishing polar coordinate equations of the upper circular arc $\theta_{1upper}(r)$ and the lower circular arc $\theta_{1lower}(r)$ as:

$$\theta_{1upper}(r) = \alpha_0 + \arccos\left(\frac{L_1^2 + r^2 - R_1}{2rL_1}\right), r \in [R_3, R_2] \qquad (2)$$

$$\theta_{1lower}(r) = \alpha_0 - \arccos\left(\frac{L_1^2 + r^2 - R_1}{2rL_1}\right), r \in [R_3, R_2] \qquad (3)$$

wherein r is a polar radius of any point on the circular arc line, and $R_1$ is a radius of the circular arc line; $R_2$ is a maximum polar radius of the circular arc line and is equal to a length of a connecting line segment between a polar point and an upper end point or a lower end point of the circular arc line; $R_3$ is a minimum polar radius of the circular arc line and is equal to a length of a connecting line segment between the polar point and the midpoint of the circular arc line; $L_1$ is a polar radius of a center of a circle of the circular arc line;

$$\alpha_0 = \frac{\pi}{2n_b}$$

is a polar angle corresponding to $R_3$; and $n_b$ is the number of the vanes;
respectively establishing polar coordinate equations of an upper straight line segment $\theta_{2upper}(r)$ and a lower straight line segment $\theta_{2lower}(r)$ as:

$$\theta_{2upper}(r) = \frac{\pi}{n_b} - 2\arctan\left(\frac{-2r + \sqrt{4r^2 - 4\tan^2(\beta)(R_2^2 - r^2)}}{2(r + R_2)\tan(\beta)}\right) \qquad (6)$$

$$\theta_{2lower}(r) = 2\arctan\left(\frac{-2r + \sqrt{4r^2 - 4\tan^2(\beta)(R_2^2 - r^2)}}{2(r + R_2)\tan(\beta)}\right) \qquad (7)$$

wherein $\beta$ is a bending angle formed by the upper straight line segment $\theta_{2upper}(r)$ and the upper circular arc $\theta_{1upper}(r)$ or the lower straight line segment $\theta_{2lower}(r)$ and the lower circular arc $\theta_{1lower}(r)$;
establishing a polar coordinate equation of the two fillets as:

$$(x-x_0)^2 + (y-y_0)^2 = R_0^2 \qquad (22)$$

wherein (x,y) are coordinates of any point on circles where the fillets are located, and $(x_0, y_0)$ are circle center coordinates of the circles where the fillets are located; and $R_0$ is a radius of each of the fillets;
establishing relational expressions among a plurality of variables $x_0, y_0, L_1, R_0, R_1, R_2, R_3, \beta$ as:

$$x_0 = \frac{-F - \sqrt{F^2 - 4EG}}{2E} \qquad (23)$$

$$y_0 = tx_0 - R_0\sqrt{1+t^2} + R_2\left(\sin\frac{\pi}{n_b} - \cos\frac{\pi}{n_b}t\right) \qquad (24)$$

$$E = t^2 + 1 \qquad (25)$$

$$F = -2g + 2R_2 t\left(\sin\frac{\pi}{n_b} - \cos\frac{\pi}{n_b}t\right) - 2ht - 2R_0 t\sqrt{1+t^2} \qquad (26)$$

$$G = R_0^2 t^2 + 2R_0 R_2\left(-\sqrt{1+t^2} \cdot \left(\sin\frac{\pi}{n_b} - \cos\frac{\pi}{n_b} \cdot t\right) + 2h\sqrt{1+t^2} + 2R_1\right) + \qquad (27)$$

$$g^2 + h^2 + R_2^2\left(\sin\frac{\pi}{n_b} - \cos\frac{\pi}{n_b}t\right)^2 - 2R_2^2 h\left(\sin\frac{\pi}{n_b} - \cos\frac{\pi}{n_b}t\right) - R_1^2$$

$$t = \tan\left(\frac{\pi}{n_b} - \beta\right) \qquad (28)$$

$$g = L_1 \cos\left(\frac{\pi}{2n_b}\right) \qquad (29)$$

$$h = L_1 \sin\left(\frac{\pi}{2n_b}\right) \qquad (30)$$

wherein E, F, G, t, g and h are all intermediate variables;
calculating a mud throttling area $A(\phi)$ formed when the oscillating shear valve rotates:

$$A(\phi) = \qquad (31)$$

$$\begin{cases} n_b(A_1(\phi) + A_2(\phi) - 2A_3 - 2A_5) + A_{min}, & (0 < \phi \le \theta_1) \\ n_b(A_2(\phi) + A_4(\phi) - 2A_5) + A_{min}, & \left(\theta_1 < \phi \le 2\arctan\left(\frac{u}{l}\right) - \frac{\pi}{n_b}\right) \\ n_b A_6(\phi) + A_{min}, & \left(\left(2\arctan\left(\frac{u}{l}\right) - \frac{\pi}{n_b}\right) < \phi \le \left(2\arctan\left(\frac{v}{c}\right) - \frac{\pi}{n_b}\right)\right) \\ n_b A_7(\phi) + A_{min}, & \left(\left(2\arctan\left(\frac{v}{c}\right) - \frac{\pi}{n_b}\right) < \phi \le \theta_2\right) \\ A_{min}, & \left(\theta_2 < \phi \le \frac{\pi}{n_b}\right) \end{cases}$$

wherein $$A_1(\phi) = \frac{1}{2} \cdot \left(\frac{\pi}{n_b} - \phi\right) \cdot \left(\left(\frac{d}{2}\right)^2 - R_2^2\right) \qquad (9)$$

$$A_1(\phi) = \int_{r_j}^{R_2} 2(\theta_{1+}(r) - \theta_{1+}(r_j)) \cdot r \cdot dr \qquad (10)$$

$$r_j(\phi) = \frac{L_1 \cos\left(\frac{\phi}{2}\right) - \sqrt{4L_1^2 \cos^2\left(\frac{\phi}{2}\right) - 4(L_1^2 - R_1^2)}}{2} \qquad (11)$$

-continued $$A_3 = \int_{R_2}^{\frac{D}{2}} \theta_{2,r}(r) \cdot r \cdot dr \tag{12}$$

$$A_{min} = \frac{\pi}{2}\left(\left(\frac{D}{2}\right)^2 - \left(\frac{d}{2}\right)^2\right) \tag{13}$$

$$A_4(\phi) = \int_{R_2}^{r_{max}(\phi)} 2(\theta_{2,r}(r) - \theta_{2,r}(r_{max}(\phi))) \cdot r \cdot dr \tag{14}$$

$$A_5 = A_{51} + A_{52} - A_{53} - A_{54} \tag{32}$$

$$A_{51} = \frac{1}{2}\sqrt{l^2 + u^2} \frac{\left|\frac{u}{l}v - c\right|}{\sqrt{1 + (u/l)^2}} \tag{33}$$

$$A_{52} = \frac{1}{2}\sqrt{v^2 + c^2} \frac{\left|R - 2\right|\left(\cos\left(\frac{\pi}{n_b}\right) \cdot \frac{c}{v} - \sin\left(\frac{\pi}{n_b}\right)\right)}{\sqrt{1 + \left(\frac{c}{v}\right)^2}} \tag{34}$$

$$A_{53} = \frac{1}{2}R_2^2\left(\frac{\pi}{n_b} - \arctan\left(\frac{u}{l}\right)\right) - \int_{\sqrt{l^2+u^2}}^{R_2} \left(\theta_{10}(r) - \arctan\left(\frac{u}{l}\right)\right) \cdot r \cdot dr \tag{35}$$

$$A_{54} = \arcsin\left(0.5\frac{\sqrt{(v-j)^2 + c - z)^2}}{R_0}\right). \tag{36}$$

$$r_{max}(\phi) = \frac{R_0\left(R_0 - \cos\left(\arcsin\left(0.5\frac{\sqrt{(v-j)^2 + c - z)^2}}{R_0}\right)\right)\right)\left(1 + \tan\left(\frac{\pi - n_b\phi}{4n_b}\right)\right) \cdot R_2 \cdot \tan(\beta)}{\left(1 - \tan\left(\frac{\pi - n_b\phi}{4n_b}\right)^2\right) \cdot \tan(\beta) - 2\tan\left(\frac{\pi - n_b\phi}{4n_b}\right)} \tag{15}$$

$$A_6(\phi) = 2(A_{61}(\phi) + A_{62}(\phi)) \tag{37}$$

$$A_{61}(\phi) = \frac{1}{2} \cdot \frac{\left|\tan\left(\frac{\phi}{2} + \frac{\pi}{2n_b}\right) \cdot v - c\right|}{\sqrt{\tan^2\left(\frac{\phi}{2} + \frac{\pi}{2n_b}\right)}} \cdot \sqrt{(a-j)^2 + (b-z)^2} \tag{38}$$

$$A_{62}(\phi) = R_0^2 \cdot \arcsin\left(\frac{\sqrt{(j-v)^2 + (z-c)^2}}{2R_0}\right) - \tag{39}$$

$$\frac{1}{2}\sqrt{(j-v)^2 + (z-c)^2} \cdot \sqrt{R_0^2 - \frac{(j-v)^2 + (z-c)^2}{4}}$$

$$A_7(\phi) = R_0^2 \arcsin\left(\frac{\sqrt{(l-o)^2 + (u-h)^2}}{2R_0}\right) - \tag{40}$$

$$\frac{1}{2}\sqrt{(l-o)^2 + (u-h)^2} \sqrt{R_0^2 - \frac{(l-o)^2 + (u-h)^2}{4}}$$

$$\theta_1 = 2\left(\frac{\pi}{n_b} + 2\left(\theta_{2,r}\left(\frac{D}{2}\right) + \frac{\pi}{n_b}\right)\right) - \frac{\pi}{n_b} \tag{41}$$

$$\theta_2 = 2\arctan\left(\max\left((x_0^2 - R_0^2)x^2 - 2x_0y_0x + y_0^2 - R_0^2 = 0\right)\right) - \frac{\pi}{n_b} \tag{42}$$

wherein $A_1$ is an annular area formed by taking the maximum polar radius $R_2$ as an internal radius and a radius $d/2$ of the rotator as an external radius and a differential angle between the angle of each of the valve orifices $\pi/n_b$ of the vans and the rotation angle $\phi$ as a central angle; $A_2$ is an area defined by the circular arc lines and a circle formed by taking the polar point O as a center and $R_2$ as a radius; $A_3$ is an area defined by an extension line of $R_2$ a circumferential line of the rotator and one of the straight line segments; $A_4$ is an area defined by the circle formed by taking the polar point O as the center and $R_2$ as the radius and the two straight line segments; $A_5$ is an area defined by the circular arc line, one fillet and one straight line segment and is segmented into four parts $A_{51}$, $A_{52}$, $A_{53}$ and $A_{54}$ to be calculated; $A_6$ is an area defined by the two fillets and the two straight line segments; $A_7$ is an area defined by the two fillets; $A_{min}$ is a minimum flow area of the oscillating shear valve; $\theta_1$ is a rotation angle when the oscillating shear valve rotates to a position where an end point of one straight line segment of the rotator coincides with an end point of one straight line segment of the stator; $\theta_2$ is a rotation angle when the oscillating shear valve rotates to a position where one fillet of the rotator is tangent to one fillet of the stator; (l,u) are coordinates of a tangent point of one fillet and the circular arc line; (v,c) are coordinates of a tangent point of one straight line segment and one fillet; (j,z) and (o,k) are coordinates of intersection points of a straight line taking a tangent value of the rotation angle as a slope and passing through the polar point O and a circle where one fillet is located; (a,b) are coordinates of an intersection point of a straight line where one straight line segment is located and a straight line passing through (j,z) and the polar point O; $r_j(\phi)$ and $r_{max}(\phi)$ are both intermediate variables; and D is an external diameter of the stator; and according to a relation between a thin-walled cutting edge fluid differential pressure $\Delta P(\phi)$ and the mud throttling area $A(\phi)$, establishing a relational expression between the mud throttling area and the fluid differential pressure as:

$$\Delta P(\phi) = \frac{\rho Q^2}{2C_d A(\phi)^2} \tag{16}$$

wherein $\rho$ is a density of mud, with a unit: $kg/m^3$; Q is a flow amount of a drilling fluid, with a unit: $m^3/s$; and $C_d$ is a flow coefficient which is 0.6-0.8;

determining the radius $R_1$ and the maximum polar radius $R_2$ of the circular arc line, the bending angle $\beta$ and the radius $R_0$ of each of the fillets by adopting a correlation coefficient index R of the fluid differential pressure $\Delta P(\phi)$ and a standard sinusoidal wave to complete design of the valve orifices of the oscillating shear valve; wherein the correlation coefficient index R is expressed as:

$$R = \frac{\int_0^T \Delta P(\phi) \times \Delta P_0(\phi) d\phi}{\sqrt{\int_0^T \Delta P^2(\phi)} \times \sqrt{\int_0^T \Delta P_0^2(\phi)}} \tag{17}$$

wherein $\Delta P_0(\phi)$ is a standard sinusoidal pressure wave signal, and T is a differential pressure signal period of the valve orifices of the oscillating shear valve.

2. The oscillating shear valve of the continuous pulse generator according to claim 1, wherein the external diameter of the stator is 5-10 mm larger than an external diameter of the rotator.

* * * * *